US012609795B2

(12) United States Patent
Maki et al.

(10) Patent No.: US 12,609,795 B2
(45) Date of Patent: Apr. 21, 2026

(54) TERMINAL, BASE STATION, AND COMMUNICATION METHOD

(71) Applicant: Panasonic Intellectual Property Corporation of America, Torrance, CA (US)

(72) Inventors: Shotaro Maki, Kanagawa (JP); Hidetoshi Suzuki, Kanagawa (JP); Hongchao Li, Langen (DE); Ayako Horiuchi, Kanagawa (JP); Akihiko Nishio, Osaka (JP); Xuan Tuong Tran, Singapore (SG); Yoshihiko Ogawa, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 369 days.

(21) Appl. No.: 18/248,506

(22) PCT Filed: Jul. 1, 2021

(86) PCT No.: PCT/JP2021/025024
§ 371 (c)(1),
(2) Date: Apr. 10, 2023

(87) PCT Pub. No.: WO2022/079955
PCT Pub. Date: Apr. 21, 2022

(65) Prior Publication Data
US 2023/0412340 A1 Dec. 21, 2023

(30) Foreign Application Priority Data
Oct. 15, 2020 (JP) ................................. 2020-174051

(51) Int. Cl.
*H04L 5/00* (2006.01)
*H04W 72/232* (2023.01)

(52) U.S. Cl.
CPC ......... *H04L 5/0051* (2013.01); *H04W 72/232* (2023.01)

(58) Field of Classification Search
CPC .. H04L 5/0051; H04L 5/0023; H04W 72/232; H04W 16/28
(Continued)

(56) References Cited

U.S. PATENT DOCUMENTS

2017/0078006 A1* 3/2017 Liu ...................... H04W 72/23
2019/0342062 A1* 11/2019 Ren .......................... H04L 5/10
(Continued)

OTHER PUBLICATIONS

Ericsson, "On multi-TRP and multi-panel," R1-1907697, Agenda Item: 7.2.8.2, 3GPP TSG RAN WG1 Meeting RAN1#97, Reno, US, May 13-17, 2019. (18 pages).
(Continued)

*Primary Examiner* — Candal Elpenord
(74) *Attorney, Agent, or Firm* — Seed Property Law Group LLP

(57) ABSTRACT

According to the present invention, the received quality of a terminal is improved. The terminal comprises: a reception circuit, which receives information for providing a notification of the port of a reference signal for a downlink data signal; and a control circuit, which controls the reception of the downlink data signal and the reference signal, on the basis of a number of ranks less than the number of ports indicated by the received information.

14 Claims, 16 Drawing Sheets

(58) Field of Classification Search
USPC ................................................... 370/329–330
See application file for complete search history.

(56) References Cited

U.S. PATENT DOCUMENTS

| 2021/0376898 | A1* | 12/2021 | Levitsky | .............. | H04B 7/0626 |
| 2022/0045893 | A1* | 2/2022 | Yamada | ................ | H04L 1/1896 |
| 2022/0150019 | A1* | 5/2022 | Xiao | ..................... | H04L 5/0053 |
| 2022/0166584 | A1* | 5/2022 | Chai | ..................... | H04L 5/0023 |
| 2022/0201712 | A1* | 6/2022 | Su | ......................... | H04L 5/0094 |

OTHER PUBLICATIONS

Huawei et al., "Signaling of DMRS ports for SU/MU-MIMO," R1-1710455, Agenda Item: 5.1.2.4.8, 3GPP TSG RAN WG1 NR Ad Hoc Meeting, Qingdao, China, Jun. 27-30, 2017. (6 pages).

Xiaomi Communications, "Discussion on UE Capability Issues for reduced capability NR devices," R2-2006733, Agenda Item: 8.12.2.1, 3GPP TSG-RAN WG2 Meeting #111 electronic, Online, Aug. 17-28, 2020. (3 pages).

3GPP, "3rd Generation Partnership Project; Technical Specification Group Radio Access Network; NR; Multiplexing and channel coding (Release 16)," 3GPP TS 38.212 V16.3.0, Sep. 2020. (152 pages).

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019. (99 pages).

3GPP, "3rd Generation Partnership Project; Technical Specification Group Radio Access Network; NR; Physical channels and modulation (Release 15)," 3GPP TS 38.211 V15.6.0, Jun. 2019. (97 pages).

3GPP, "3rd Generation Partnership Project; Technical Specification Group Radio Access Network; NR; Physical channels and modulation (Release 16)," 3GPP TS 38.211 V16.3.0, Sep. 2020. (133 pages).

3GPP, "3rd Generation Partnership Project; Technical Specification Group Radio Access Network; Study on Scenarios and Requirements for Next Generation Access Technologies; (Release 16)," 3GPP TR 38.913 V16.0.0, Jul. 2020. (40 pages).

3GPP, "3rd Generation Partnership Project; Technical Specification Group Services and System Aspects; System Architecture for the 5G System; Stage 2 (Release 16)," 3GPP TS 23.501 V16.1.0, Jun. 2019. (368 pages).

Ericsson, "New SID on support of reduced capability NR devices," RP-193238, Agenda Item: 9.1.1, 3GPP TSG RAN Meeting #86, Sitges, Spain, Dec. 9-12, 2019. (9 pages).

International Search Report, mailed Sep. 28, 2021, for International Patent Application No. PCT/JP2021/025024. (5 pages) (with English translation).

ITU, "IMT Vision—Framework and overall objectives of the future development of IMT for 2020 and beyond," Recommendation ITU-R M.2083-0, Sep. 2015. (21 pages).

NTT DOCOMO, Inc., "Revised WID on New Radio Access Technology," RP-181726, Agenda Item: 9.2.1, 3GPP TSG RAN Meeting #81, Gold Coast, Australia, Sep. 10-13, 2018. (13 pages).

* cited by examiner

100

101

107

CONTROLLER

TRANSMITTER

200

208

202

CONTROLLER

RECEIVER

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0,1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0,1 | 1 |
| 8 | 2 | 2,3 | 1 |
| 9 | 2 | 0-2 | 1 |
| 10 | 2 | 0-3 | 1 |
| 11 | 2 | 0,2 | 1 |
| 12 | 2 | 0,3 | 1 |
| 13 | 2 | 1,2 | 1 |
| 14 | 2 | 1,3 | 1 |
| 15 | 2 | 0,2,3 | 1 |
| ⋮ | ⋮ | ⋮ | ⋮ |

~ Additional value(s)

TERMINAL, BASE STATION, AND COMMUNICATION METHOD

TECHNICAL FIELD

The present disclosure relates to a terminal, a base station, and a communication method.

BACKGROUND ART

A communication system referred to as 5th generation mobile communication system (5G) has been discussed. The 3rd Generation Partnership Project (3GPP) as an international standardizing body has been discussing upgrading of the 5G communication system in view of both of upgrading of Long Term Evolution (LTE)/LTE-Advanced (LTE-A) systems and New Radio Access Technology (New RAT, also referred to as NR) which is a new scheme not necessarily backward compatible, with the LTE/LTE-A systems (e.g., see Non-Patent Literature (hereinafter referred to as "NPL") 1).

CITATION LIST

Non-Patent Literature

NPL 1
    RP-181726, "Revised WID on New Radio Access Technology," September 2018
NPL 2
    RP-193238, "New SID on Support of Reduced Capability NR Devices," December 2019
NPL 3
    3GPP TS38.212 V16.3.0, "Multiplexing and channel coding (Release 16)," 2020 September
NPL 4
    3GPP TS38.211 V16.3.0, "Physical channels and modulation (Release 16)," 2020 September

SUMMARY OF INVENTION

However, there is scope for further study on improvement of reception performance (or received quality) of (in) a terminal.

One non-limiting and exemplary embodiment facilitates providing a terminal, a base station, and a communication method each capable of improving received quality.

A terminal according to an exemplary embodiment of the present disclosure includes: reception circuitry, which, in operation, receives information indicating a plurality of ports for a reference signal for a downlink data signal; and control circuitry, which, in operation, controls reception of the downlink data signal and the reference signal, based on the number of ranks which is less than the number of the plurality of ports indicated by the information.

It should be noted that general or specific embodiment may be implemented as a system, a method, an integrated circuit, a computer program, a storage medium, or any selective combination thereof.

According to an exemplary embodiment of the present disclosure, it is possible to improve received quality in a terminal.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 12 illustrates an example of an extended correspondence relation between a value of a Downlink Control Information (DCI) parameter (Antenna port(s)) and a Demodulation Reference Signal (DMRS) port;

DESCRIPTION OF EMBODIMENTS

Hereinafter, an embodiment of the present disclosure will be described in detail with reference to the accompanying drawings.

NR Numerology

Figure 1:
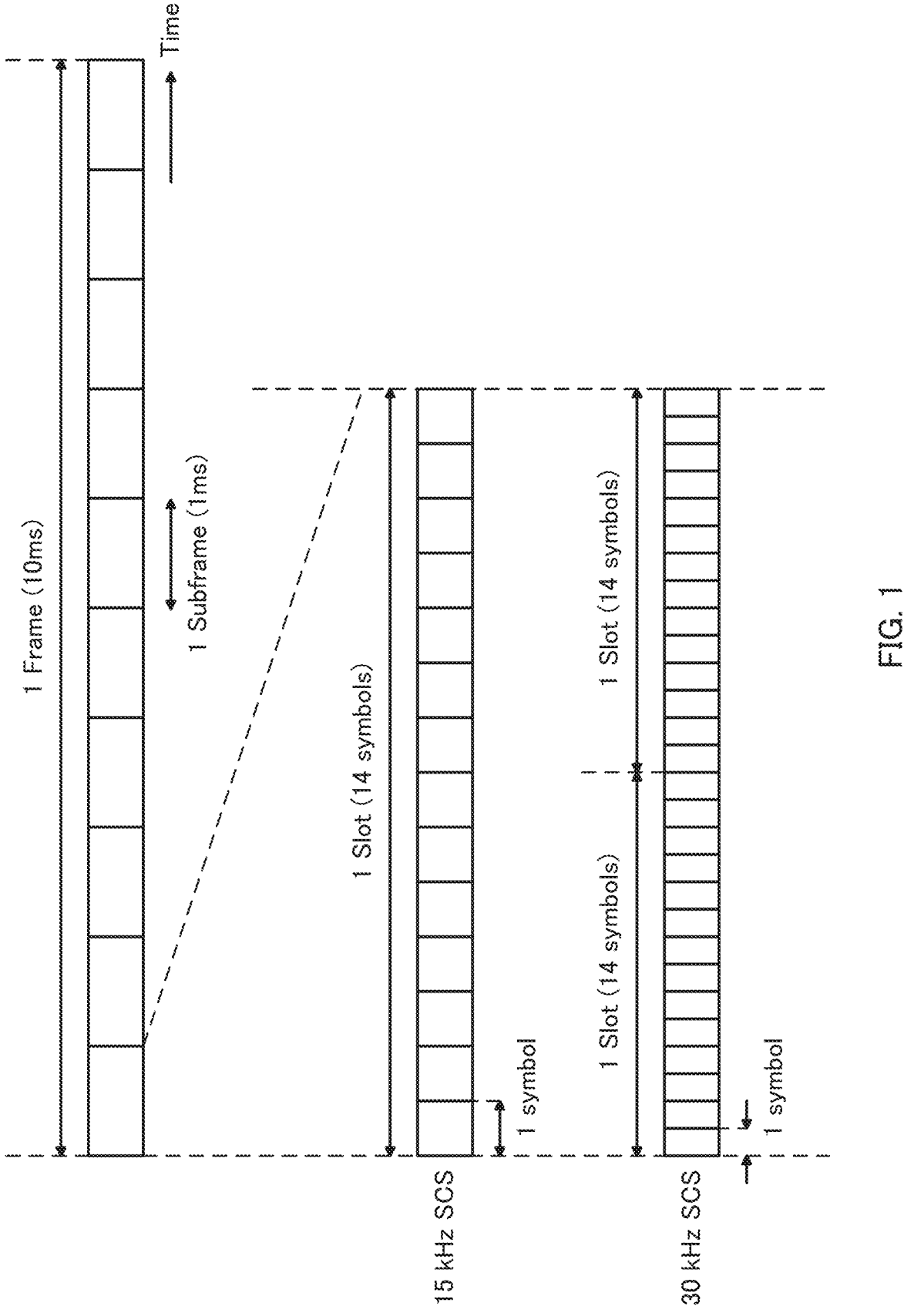
FIG. 1 illustrates a configuration example of a radio frame.

In the following description, for example, each of a radio resource (frame), a slot, and a symbol is a physical resource unit in a time domain. For example, as illustrated in FIG. 1, the length of one frame may be 10 milliseconds. By way of example, one frame may be composed of a plurality (e.g., 10, 20, or other values) of slots. Further, for example, the number of slots composing one frame may be variable depending on the slot length. Meanwhile, one slot may be composed of, for example, a plurality (e.g., 14 or 12) of symbols. For example, one symbol is the smallest physical-resource unit in the time domain, and a symbol length may vary depending on a subcarrier spacing (SCS).

In addition, each of a subcarrier and a resource block (RB) is a physical-resource unit in a frequency domain. In one example, one resource block may be composed of 12 subcarriers. For example, one subcarrier may be the smallest physical-resource unit in the frequency domain. The subcarrier spacing is variable and may be, for example, 15 kHz, 30 kHz, 60 kHz, 120 kHz, 240 kHz, or other values.

Coverage Enhancement in RedCap

According to NPL 2, a technique to realize a mobile station of lower cost than that in the initial release of NR (Reduced Capability NR Devices, RedCap, NR-Lite, or NR-Light) is likely to be specified. For example, in order to reduce costs, the matters have been discussed such as limiting the maximum value of the number of ranks, decreasing the number of antennae provided to the mobile station, and reducing the supported bandwidth. In addition, there is a concern that these constraints may lead to a reduction in coverage (or cell range). Accordingly, it is expected that a technique to compensate for (or enhance) the coverage will be studied.

Indication of DMRS Port

According to NPL 3, a DMRS port used for transmission of a downlink data channel (e.g., PDSCH: Physical Downlink Shared Channel) is indicated to a mobile station by an Antenna port(s), which is a parameter included in downlink control information (e.g., DCI format 1_1), for example.

The mobile station determines which DMRS port is used for the PDSCH transmission, by collating the indicated parameter with, for example, Table 1 below. In one example, when a value of the indicated Antenna port(s) is 11, the mobile station determines that two DMRS ports, 0 and 2, are used for the PDSCH transmission. Note that, in Table 1, "CDM" is an abbreviation for code-division multiplexing.

TABLE 1

| Value | Number of DMRS CDM group(s) without data | DMRS port(s) | Number of front-load symbols |
|---|---|---|---|
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| . | . | . | . |
| . | . | . | . |
| . | . | . | . |

Further, according to NPL 4, in the PDSCH transmission, the number of DMRS ports and the number of ranks of match with each other. Therefore, for example, indication for the DMRS ports in number greater than the number of ranks is not supported.

Relation between RedCap Mobile Station and the Number of Ranks

The maximum value of the number of ranks may be limited for a RedCap mobile station. According to NPL 4, since the number of DMRS ports and the number of ranks match with each other in the PDSCH transmission, limitation of the maximum value of the number of ranks may result in similar limitation of the maximum value of the number of DMRS ports.

On the other hand, by using more DMRS ports for the PDSCH transmission, improvement of the reception performance of PDSCH in the RedCap mobile station is expected, and thus, compensation for (or enhancement of) coverage is also expected.

In one non-limiting and exemplary embodiment of the present disclosure, for example, a description will be given of a method with which coverage can be compensated for by improving reception performance (or received quality) of PDSCH in a terminal (RedCap terminal) with the limitation or constraint on function or capability as mentioned above.

Overview of Communication System

A communication system according to an embodiment of the present, disclosure includes base station 100 and terminal 200.

Figure 2:
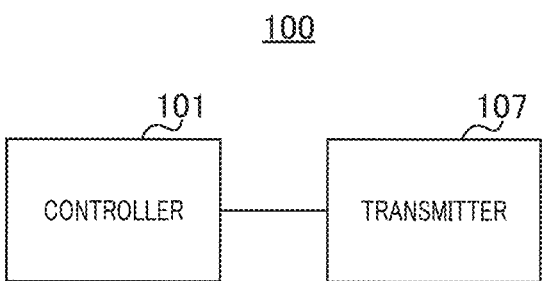
FIG. 2 is a block diagram illustrating a configuration example of a part of a base station.

FIG. 2 is a block diagram illustrating a configuration example of a part of base station 100 according to an exemplary embodiment of the present disclosure. In base station 100 illustrated in FIG. 2, transmitter 107 (e.g., corresponding to reception circuit) transmits information (e.g., DCI) indicating a port (e.g., DMRS port) for a reference signal (e.g., DMRS) for a downlink data signal (e.g., PDSCH signal), for example. Controller 101 (e.g., corresponding to control circuitry) controls transmission of the downlink data signal and the reference signal, with the number of ranks which is less than the number of ports indicated by the transmitted information.

Figure 3:
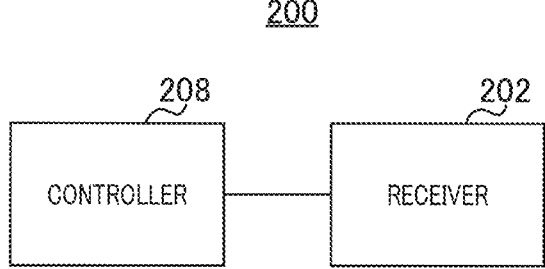
FIG. 3 is a block diagram illustrating a configuration example of a part of a terminal.

FIG. 3 is a block diagram illustrating a configuration example of a part of terminal 200 according to an exemplary embodiment of the present disclosure. In terminal 200 illustrated in FIG. 3, receiver 202 (e.g., corresponding to transmission circuitry) receives information indicating a port for a reference signal for a downlink data signal. Controller 208 (e.g., corresponding to control circuitry) controls reception of the downlink data signal and the reference signal, based on the number of ranks which is less than the number of ports indicated by the received information.

Configuration of Base Station

Figure 4:
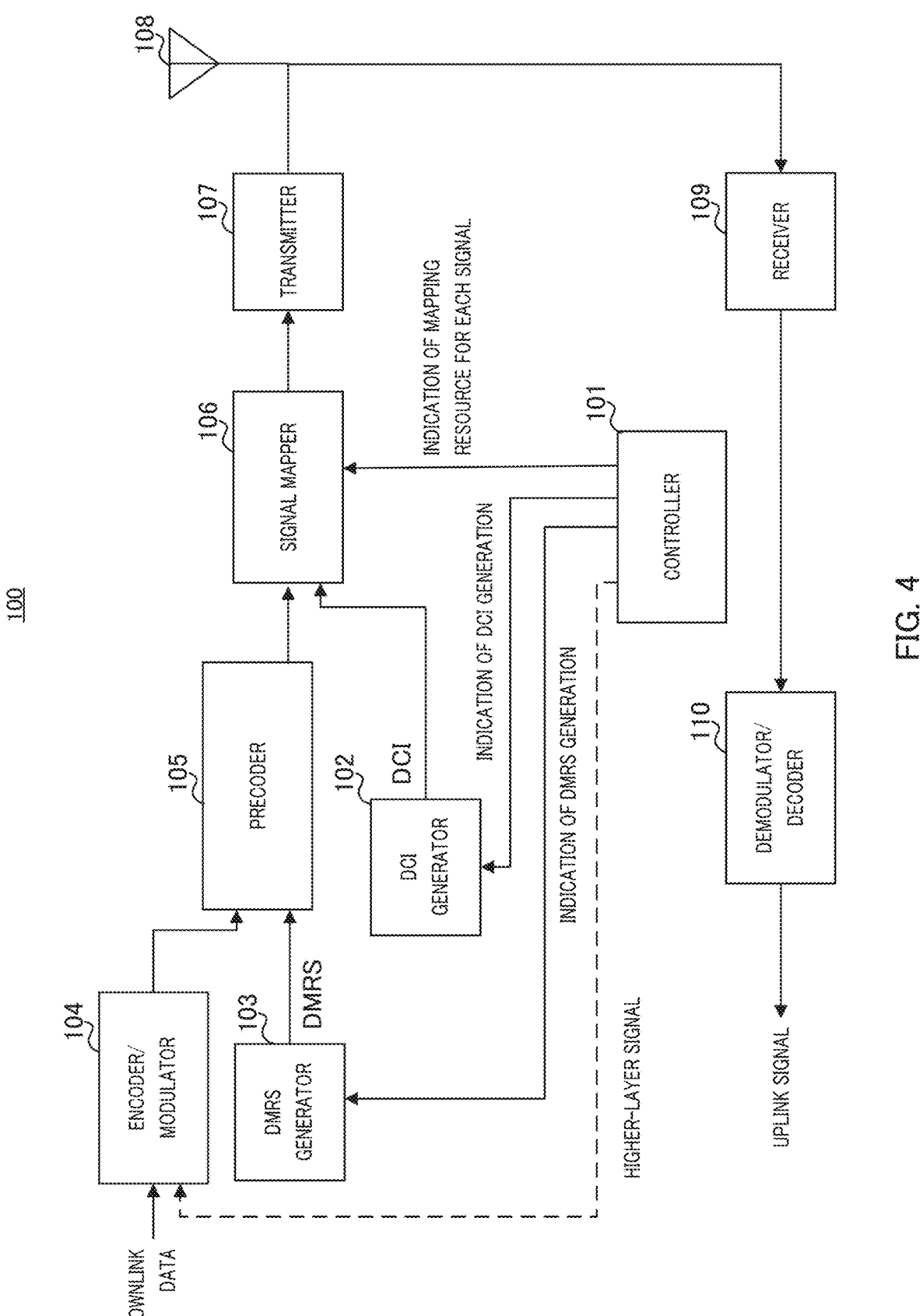
FIG. 4 is a block diagram illustrating a configuration example of the base station.

FIG. 4 is a block diagram illustrating a configuration example of base station 100 according to Embodiment 1. In FIG. 4, base station 100 includes controller 101, DCI generator 102, DMRS generator 103, encoder/modulator 104, precoder 105, signal mapper 106, transmitter 107, antenna 108, receiver 109, and demodulator/decoder 110.

Controller 101 determines the number of ranks for the PDSCH transmission, a DMRS port to be indicated to mobile station 200, and a time-/frequency-resource for the PDSCH, for example. Controller 101 indicates, based on the determined information, generation of DCI to DCI generator 102, for example. Controller 101 also indicates, based on the determined information, generation of DMRS to DMRS generator 103, for example. Moreover, controller 101 indicates to signal mapper 106, based on the determined information, a mapping resource for each signal, for example. Further, controller 101 may generate a higher-layer signalling, based on the determined information, and output the resultant signal to encoder/modulator 104, for example. The higher-layer signalling may include, for example, a signal or information of/on Medium Access Control (MAC) or Radio Resource Control (RRC).

DCI generator 102 generates DCI, based on the indication received from controller 101, and outputs the generated DCI to signal mapper 106, for example.

DMRS generator 103 generates DMRS, based on the indication received from controller 101, and outputs the generated DMRS to precoder 105, for example.

Encoder/modulator 104 performs error correction encoding and modulation on at least one of the input downlink data signal and the higher-layer signalling from controller 101 and then outputs the resultant signal to precoder 105, for example.

Precoder 105 applies a precoding (or a precoding process) to the data signal from encoder/modulator 104 and the DMRS from DMRS generator 103 and then outputs them to signal mapper 106, for example.

Signal mapper 106 maps the data signal and the DMRS from precoder 105 to a PDSCH resource, based on the indication received from controller 101, for example. Signal mapper 106 also maps the DCI from DCI generator 102 to a Physical Downlink Control Channel (PDCCH) resource, for example. The signals mapped to the respective resources are output to transmitter 107. Incidentally, the term "map" may be mutually replaced with another term, such as "assign (allocate)" or "mapping."

Transmitter 107 performs radio (RF) transmission processing such as digital-to-analog (DA) conversion and frequency conversions using a carrier wave (e.g., up-conversion) on the signal received from signal mapper 106, and outputs the downlink radio signal to antenna 108, for example.

Antenna 108 radiates the signal from transmitter 107 to mobile station 200, for example. Additionally, antenna 108 outputs the signal received from mobile station 200 to receiver 109. The uplink signal may include, for example, a signal of a channel such as a Physical Uplink Shared Channel (PUSCH), a Physical Uplink Control Channel (PUCCH), or a Physical Random Access Channel (PRACH).

Receiver 109 performs RF reception processing such as frequency conversion (e.g., down conversion) and analog-to-digital (AD) conversion on the uplink signal received from antenna 108, and outputs the resultant signal to demodulator/decoder 110, for example.

Demodulator/decoder 110 performs demodulation processing and error-correction decoding processing on the uplink signal input from receiver 109, and thereby obtains a received bit sequence of the uplink signal, for example.

Configuration of Terminal

Figure 5:
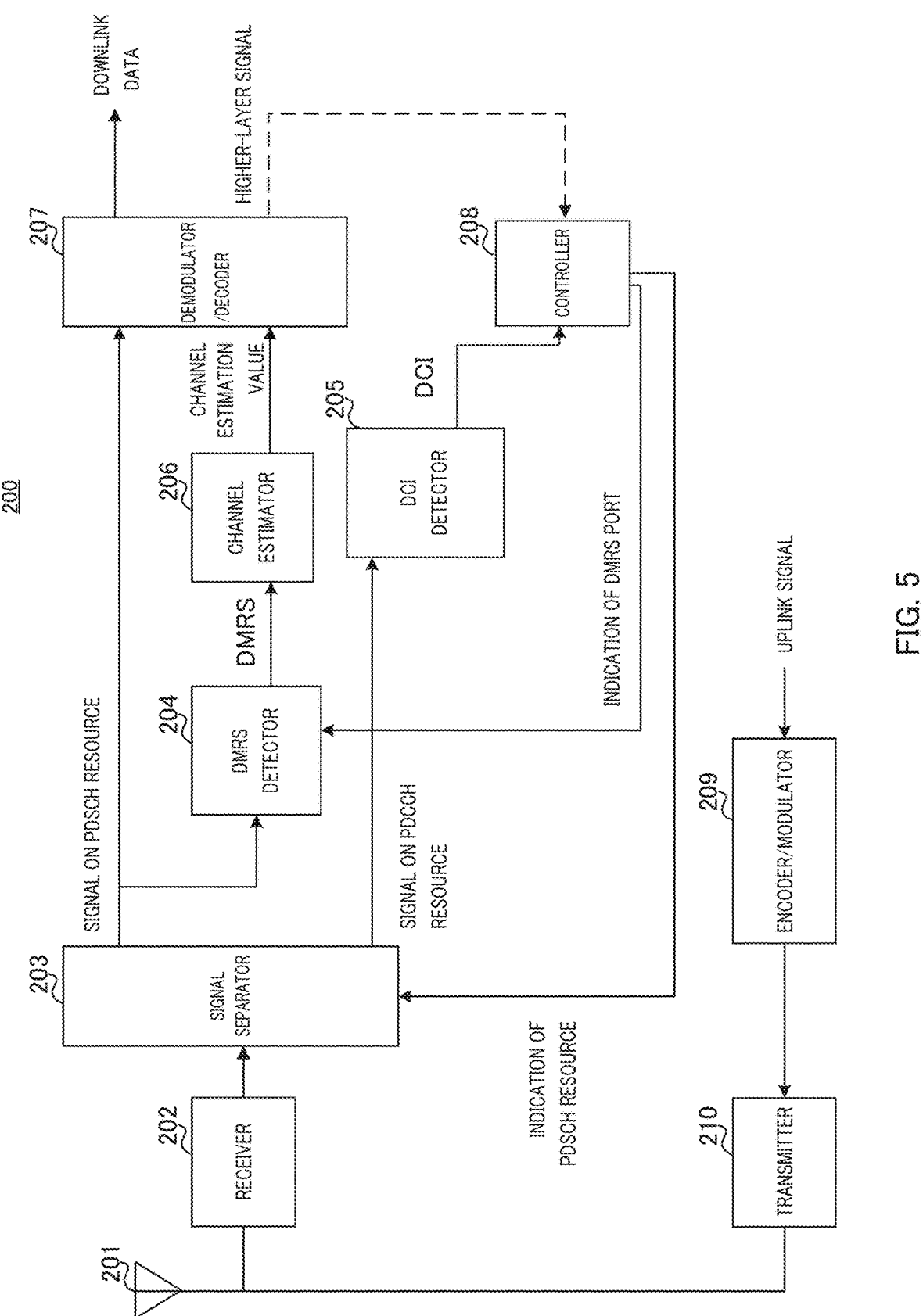
FIG. 5 is a block diagram illustrating a configuration example of the terminal.

FIG. 5 is a block diagram illustrating a configuration example of terminal 200 according to an exemplary embodiment of the present disclosure. For example, in FIG. 5, terminal 200 includes, for example, antenna 201, receiver 202, signal separator 203, DMRS detector 204, DCI detector 205, channel estimator 206, demodulator/decoder 207, controller 208, encoder/modulator 209, and transmitter 210.

Antenna 201 receives the downlink signal transmitted by base station 100 and outputs the signal to receiver 202. Additionally, antenna 201 radiates the uplink signal input from transmitter 210 to base station 100, for example.

Receiver 202 performs RF reception processing such as down conversion and AD conversion on the radio signal input from antenna 201, and outputs the resultant signal to signal separator 203, for example.

Signal separator 203 identifies a PDCCH resource, based on previously information or the like, and outputs the signal, which is mapped to the identified PDCCH resource, to DCI detector 205, for example. Signal separator 203 also identifies a PDSCH resource, based on the indication of controller 208, and outputs the signal, which is mapped to the identified PDSCH resource, to demodulator/decoder 207 and DMRS detector 204, for example.

DCI detector 205 detects a DCI from the signal on the PDCCH resource input from signal separator 203, and outputs the detected DCI to controller 208, for example.

DMRS detector 204 detects, based on the indication regarding a DMRS port from controller 208, a DMRS from the signal on the PDSCH resource input from signal separator 203, and outputs the detected DMRS to channel estimator 206, for example.

Channel estimator 206 performs a channel estimation by using the DMRS input from DMRS detector 204 and outputs the resultant channel estimation value to demodulator/decoder 207, for example Demodulator/decoder 207 performs, based on the channel estimation value input from channel estimator 206, demodulation processing and error-correction decoding processing on the signal on the PDSCH resource input from signal separator 203, and thereby obtains a downlink data signal, for example. Demodulator/decoder 207 may also obtain, for example, a higher-layer signalling by the demodulation processing and the error-correction decoding processing. The higher-layer signalling may be output to controller 208, for example.

Controller 208 identifies a PDSCH resource, based on the DCI input from DCI detector 205, and indicates the identified PDSCH resource to signal separator 203, for example. Controller 208 also identifies a DMRS port, based on the DCI input from DCI detector 205, and indicates the identified DMRS port to DMRS detector 204, for example. Further, controller 208 may identify the number of ranks, based on the DCI input from DCI detector 205 or the higher-layer signalling input from demodulator/decoder 207, for example.

Encoder/modulator 209 performs encoding processing and modulating processing on the input uplink signal (e.g., signal of channel such as PUSCH, PUCCH, or PRACH) and then outputs the resultant signal to transmitter 210, for example.

Transmitter 210 performs RF transmission processing such as DA conversion and up-conversion on the uplink signal input from encoder/modulator 209 and then outputs the resultant signal to antenna 201, for example.

Operation Examples of Base Station 100 and
Terminal 200

Some operation examples in base station 100 and terminal 200 having the above configurations will be described.

Example 1

Hereinafter, descriptions will be given of operation examples of base station 100 and terminal 200 with which coverage can be compensated for by improving received quality of a downlink data signal (e.g., PDSCH signal) in terminal (RedCap terminal) 200 with limitation or constraint on function or capability.

By way of example, terminal 200 may determine that, PDSCH reception, a PDSCH signal is transmitted with the number of ranks which is different from (e.g., smaller than) the number of DMRS ports (also referred to as "antenna ports" or simply "ports") that has been indicated from base station 100. Note that "the number of ranks" may be mutually replaced with the number of transmission layers or MIMO layers. Further, the "number of ranks" may be referred to as "a transmission rank" or simply "a rank." Further, the term "determine" may be mutually replaced with another term, such as "assume," "decide," or "identify."

For example, when the number of ports=2 is indicated from base station 100, terminal 200 may determine that the PDSCH signal is transmitted with the number of ranks=1, which is less than the number of ports=2. In other words, terminal 200 may determine that DMRS ports the number of which is greater than the number of ranks for the PDSCH may be indicated from base station 100.

The PDSCH reception based on such determination enables improvement of the PDSCH received quality in terminal 200 without modifying the existing indication method on the number of ports from base station 100 to terminal 200, thereby achieving the coverage compensation.

Operation Example 1

As non-limiting Operation Example 1, the following three examples will be described:

Operation Example 1-1: base station 100 uses one of a plurality of DMRS ports to be indicated to terminal 200;

Operation Example 1-2: base station 100 uses one of the plurality of DMRS ports to be indicated to terminal 200 and applies a plurality of precodings; and Operation Example 1-3: base station 100 uses each of the plurality of DMRS ports to be indicated to terminal 200 and maps the same downlink data signal (e.g., PDSCH) to each of the DMRS ports.

Operation Example 1-1

For example, terminal 200 performs the PDSCH reception, assuming that, of the plurality of DMRS ports to be indicated from base station 100 (e.g., port 0 and port 2), a DMRS associated with a data signal and a first DMRS port is transmitted via the first DMRS port, and a DMRS associated with a second DMRS port is mapped (or transmitted) to the first DMRS port.

Figure 6:
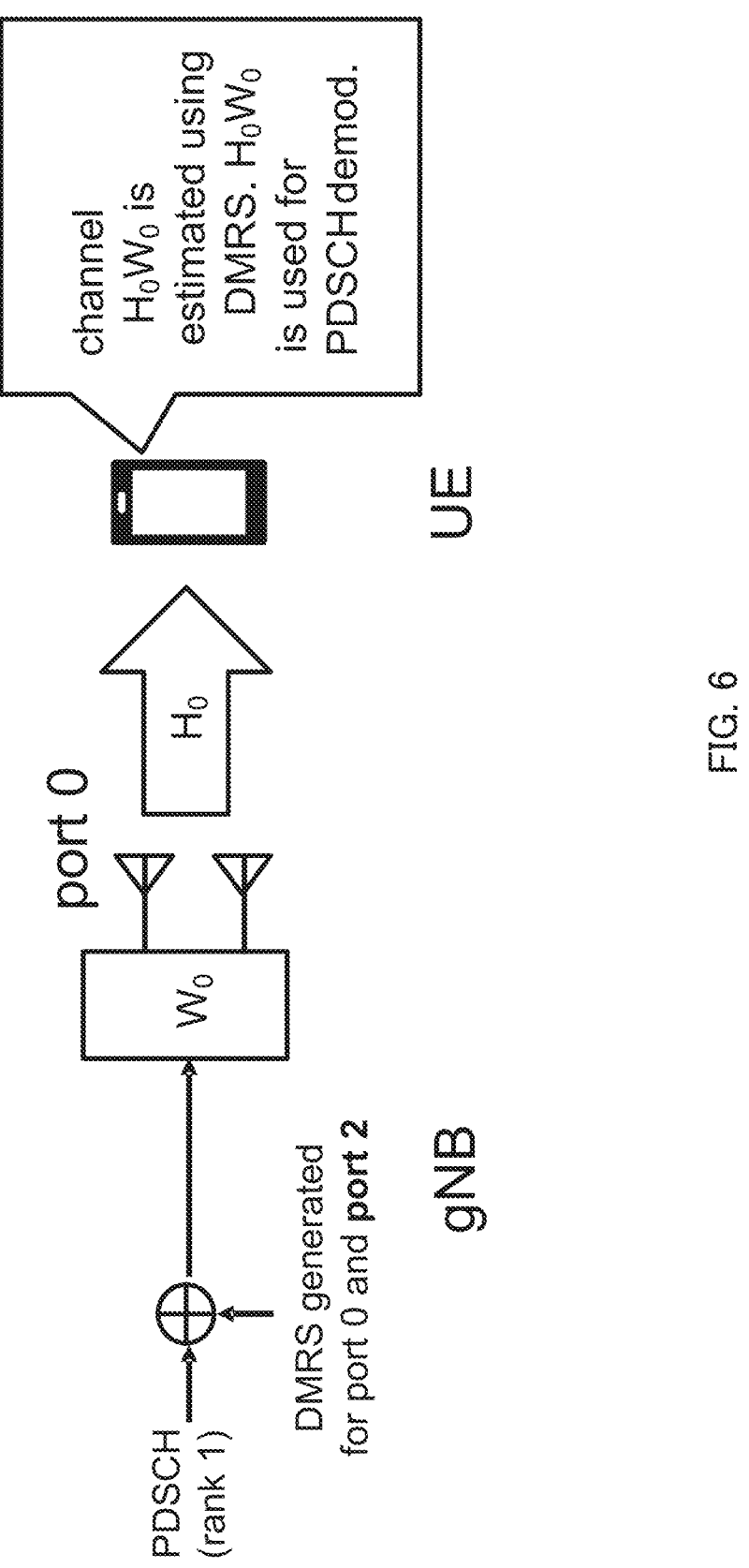
FIG. 6 is a diagram for describing Operation Example 1-1.

In one example, as illustrated in FIG. 6, base station 100 may generate two DMRSs respectively associated with two ports 0 and port 2 to be indicated terminal 200, and then transmit, via port 0, a data signal (e.g., PDSCH signal), a DMRS associated with port 0, and a DMRS associated with port 2. Alternatively, base station 100 may transmit, via port 2, the data signal (e.g., PDSCH signal), the DMRS associated with port 0, and the DMRS associated with port 2.

Terminal 200 may perform reception processing, assuming that the data signal and the two DMRSs respectively associated with port 0 and port 2 are transmitted via one port, which is port 0 or port 2, between two ports 0 and 2 indicated from base station 100.

In FIG. 6, $W_0$ represents a precoding matrix, and $H_0$ represents a propagation path matrix corresponding to the precoding matrix, $W_0$. Terminal 200 may obtain a channel estimation value, $H_0W_0$, by performing the channel estimation based on the DMRSs. The PDSCH signal may be demodulated based on the channel estimation value, $H_0W_0$.

Figure 7:
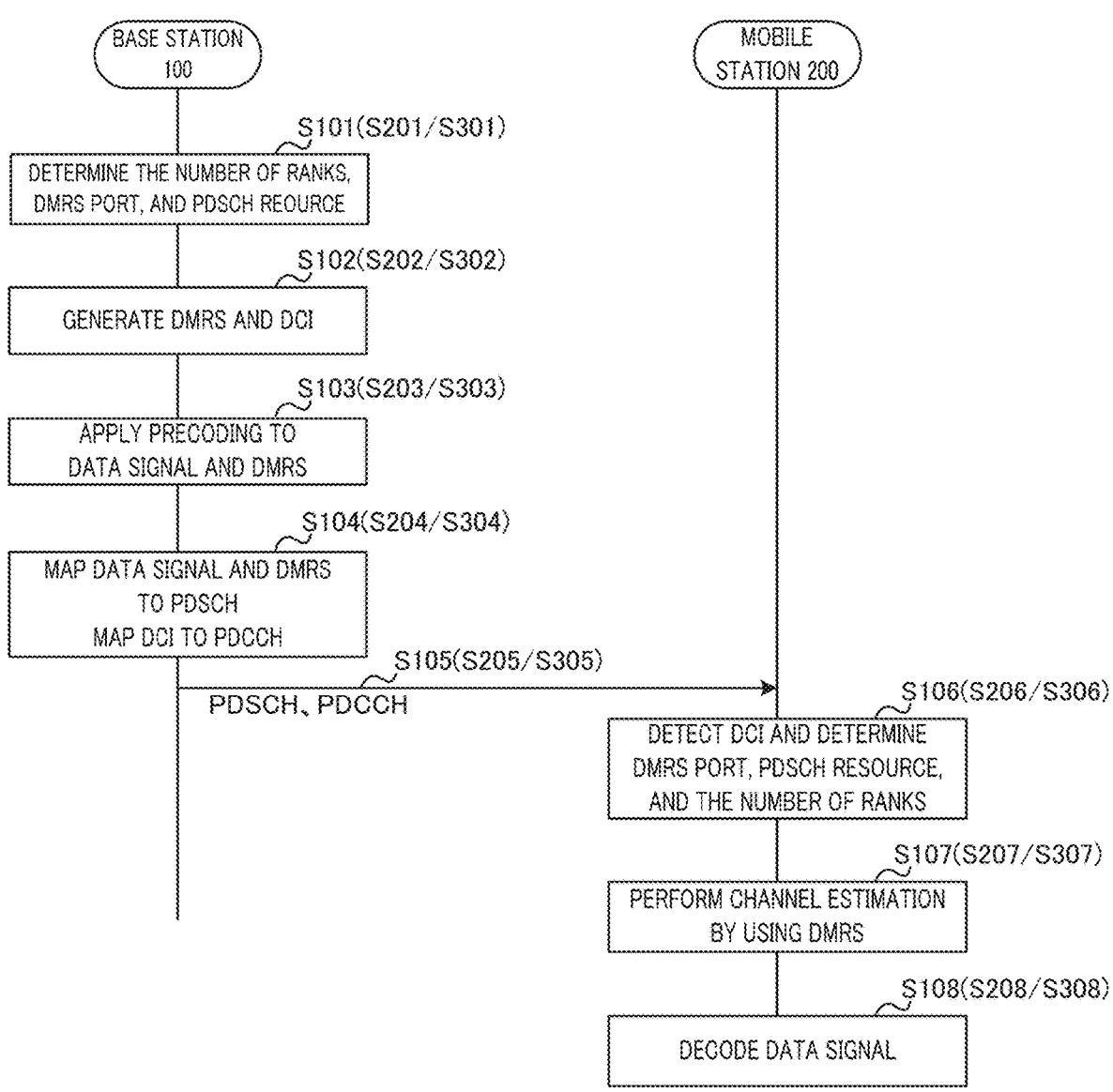
FIG. 7 is a sequence diagram illustrating Operation Example 1-1 (also Operation Examples 1-2. and 1-3)

Hereinafter, with reference to FIG. 7, Operation Example 1-1 (S101 to S108) of base station 100 and terminal 200 will be described.

(S101) Base station 100 (e.g., controller 101) determines, for PDSCH, the number of ranks (e.g., one) and DMRS ports to be indicated to terminal 200 (e.g., DMRS ports 0 and 2), for example. Further, base station 100 determines, as a first DMRS port, one DMRS port (e.g., DMRS port 0) of the DMRS ports to be indicated, for example. Moreover, base station 100 determines, of the DMRS ports to be indicated, for example, one of DMRS ports (e.g., DMRS port 2) that are different from the first DMRS port as a second DMRS port. In addition, base station 100 determines a PDSCH resource (e.g., time- and frequency-resources) to which the data signal is mapped, for example.

(S102) Base station 100 (e.g., DMRS generator 103) generates a first DMRS associated with the first DMRS port and a second DMRS associated with the second DMRS port, for example. Base station 100 (e.g., DCI generator 102) also generates DCI including information on the DMRS ports and the PDSCH resource that are to be indicated terminal 200.

(S103) Base station 100 (e.g., precoder 105) applies a precoding to each DMRS and the data signal (e.g., PDSCH signal), for example. For the precoding, the precoding matrix, $W_0$, may be applied, for example.

(S104) Base station 100 (e.g., signal mapper 106) maps the PDSCH signal, the DMRS associated with the first DMRS port, and the DMRS associated with the second DMRS port to the PDSCH resource on the first DMRS port, for example. Further, base station 100 (e.g., signal mapper 106) maps the DCI to the PDCCH resource, for example.

(S105) Base station 100 (e.g., transmitter 107) transmits, to terminal 200, the PDSCH resource and the signals mapped to the PDCCH resource, for example. Terminal 200 receives the PDSCH and the signals mapped to the PDCCH resource as described above.

(S106) Terminal 200 detects, by DCI detector 205, the DCI mapped to the PDCCH resource and identifies, by controller 208, information such as the DMRS port and the PDSCH resource indicated by the detected DCI. Further, terminal 200 (e.g., controller 208) determines that the number of ranks (e.g., one) is less than the number of DMRS ports that has been indicated (e.g., two), for example.

(S107) Terminal 200 (e.g., DMRS detector 204) detects the first DMRS and the second DMRS, based on the DMRS port identified in S106, for example. Further, terminal 200 (e.g., channel estimator 206) performs a channel estimation by using the detected DMRSs, and thereby obtains a channel estimation value, for example. In one example, terminal 200 may obtain the channel estimation value, $H_0W_0$. Here, $H_0$ may be the propagation path matrix corresponding to the precoding matrix, $W_0$.

(S108) Terminal 200 (e.g., demodulator/decoder 207) decodes the data signal on the PDSCH resource obtained in S105, by using the channel estimation value obtained in S107, for example. In one example, terminal 200 may decode the data signal by using the channel estimation value, $H_0W_0$.

In Operation Example 1-1 mentioned above, while base station 100 uses one DMRS port to transmit the PDSCH signal, DMRSs in number equivalent to the case where transmission is made by using two or more DMRS ports can be received in terminal 200. This enables improvement of the channel estimation accuracy, and consequently, the PDSCH received quality in terminal 200 can be also improved to achieve the coverage compensation.

Operation Example 1-2

Next, Operation Example 1-2 will be described. In Operation Example 1-2, for example, a downlink data signal (e.g., PDSCH signal) and a DMRS are transmitted via a first DMRS port of a plurality of DMRS ports to be indicated to terminal 200, and a plurality of precodings is applied to the first DMRS port.

Figure 8:
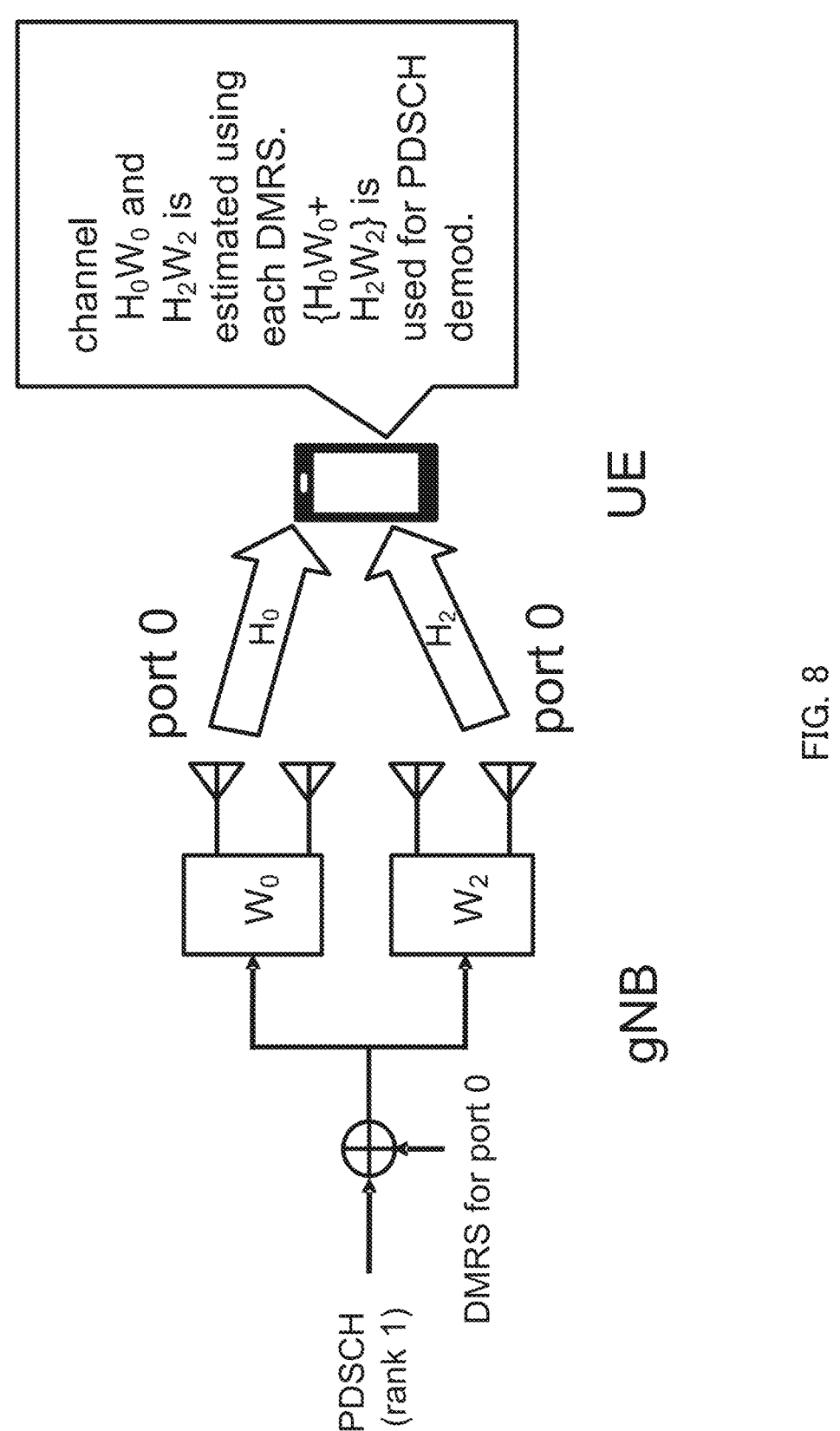
FIG. 8 is a diagram for describing Operation Example 1-2.

For example, as illustrated in FIG. 8, a PDSCH signal and a DMRS are transmitted via port 0 (or may be port 2) of port 0 and port 2 indicated to terminal 200, and precoding matrices, $W_0$ and $W_2$, may be applied to port 0.

Incidentally, in FIG. 8, $W_0$ and $W_2$ represent precoding matrices, and $H_0$ and $W_2$ represent propagation path matrices corresponding to the precoding matrices, $W_0$ and $W_2$, respectively. Terminal 200 may estimate a plurality of channels, based on the DMRS of port 0 and then obtain a plurality of channel estimation values, $H_0W_0$ and $H_2W_2$, for example. Terminal 200 may decode the PDSCH signal, based on the obtained channel estimation values, $H_0W_0$ and $H_2W_2$.

Hereinafter, with reference to FIG. 7, Operation Example 1-2 (S201 to S208) base station 100 and terminal 200 will be described.

(S201) Base station 100 (e.g., controller 101) determines, for PDSCH, the number of ranks (e.g., one) and DMRS ports to be indicated to terminal 200 (e.g., DMRS ports 0 and 2), for example. Further, base station 100 determines one of the DMRS ports to be indicated (e.g., DMRS port 0) as a first DMRS port, for example. In addition, base station 100 determines a PDSCH resource (e.g., time- and frequency-resources) to which the data signal is mapped.

(S202) Base station 100 (e.g., DMRS generator 103) generates a first DMRS associated with the first DMRS. Base station 100 (e.g., DCI generator 102) also generates DCI including information on the DMRS ports and the PDSCH resource that are to be indicated terminal 200. Note that a DMRS associated with a second DMRS port may not be generated or may not be used (or transmitted) even when being generated.

(S203) Base station 100 (e.g., precoder 105) applies the plurality of precodings to the DMRS associated with the first DMRS port and the data signal (e.g., PDSCH signal), for example. In one example, the precoding matrices, $W_0$ and $W_2$, may be applied to the DMRS of the first DMRS port and the data signal.

(S204) Base station 100 (e.g., signal mapper 106)-naps the data signal and the DMRS associated with the first DMRS port to the PDSCH resource on the first DMRS port, for example. Further, base station 100 (e.g., signal mapper 106) maps the DCI to the PDCCH resource, for example.

(S205) Base station 100 (e.g., transmitter 107) transmits, to terminal 200, the PDSCH resource and the signals mapped to the PDCCH resource. Terminal 200 receives the PDSCH and the signals mapped to the PDCCH resource as described above.

(S206) Terminal 200 detects, by DCI detector 205, the DCI mapped to the PDCCH resource and identifies, by controller 208, information such as the DMRS port and the PDSCH resource indicated by the detected DCI.

Further, terminal 200 (e.g., controller 208) determines that the number of ranks (e.g., one) is less than the number of DMRS ports that has been indicated (e.g., two), for example.

(S207) Terminal 200 (e.g., DMRS detector 204) detects the first DMRS and the second DMRS, based on the DMRS port identified in S206, for example. Further, terminal 200 (e.g., channel estimator 206) estimates a plurality of channels by using the detected DMRSs, and thereby obtains a plurality of channel estimation values, for example. For example, terminal 200 may obtain the channel estimation values, $H_0W_0$ and $H_2W_2$. Note that $H_0$ and $H_2$ may be propagation path matrices corresponding to the precoding matrices, $W_0$ and $W_2$, respectively.

(S208) Terminal 200 (e.g., demodulator/decoder 207) decodes the data signal on the PDSCH resource obtained in S205, by using the plurality of channel estimation values obtained in S207, for example. In one example, terminal 200 may decode the data signal by using the channel estimation value, $(H_0W_0+H_2W_2)$.

In Operation Example 1-2 mentioned above, although the PDSCH signal is transmitted from base station 100 by using one DMRS port, the PDSCH signal is received by terminal 200 through the plurality of propagation paths corresponding to the plurality of precodings. Therefore, the robustness of the PDSCH reception in terminal 200 can be improved by spatial diversity.

Operation Example 1-3

Next, Operation Example 1-3 will be described. In Operation Example 1-3, a DMRS is transmitted via each of a plurality of DMRS ports to be indicated to terminal 200, for example. In addition, the same data signal is mapped to these DMRS ports. Further, a precoding is applied to each of the DMRS ports. The precoding may be different or same between the DMRS ports. In the following, an example will be described in which a precoding that varies between the DMRS ports is applied.

Figure 9:
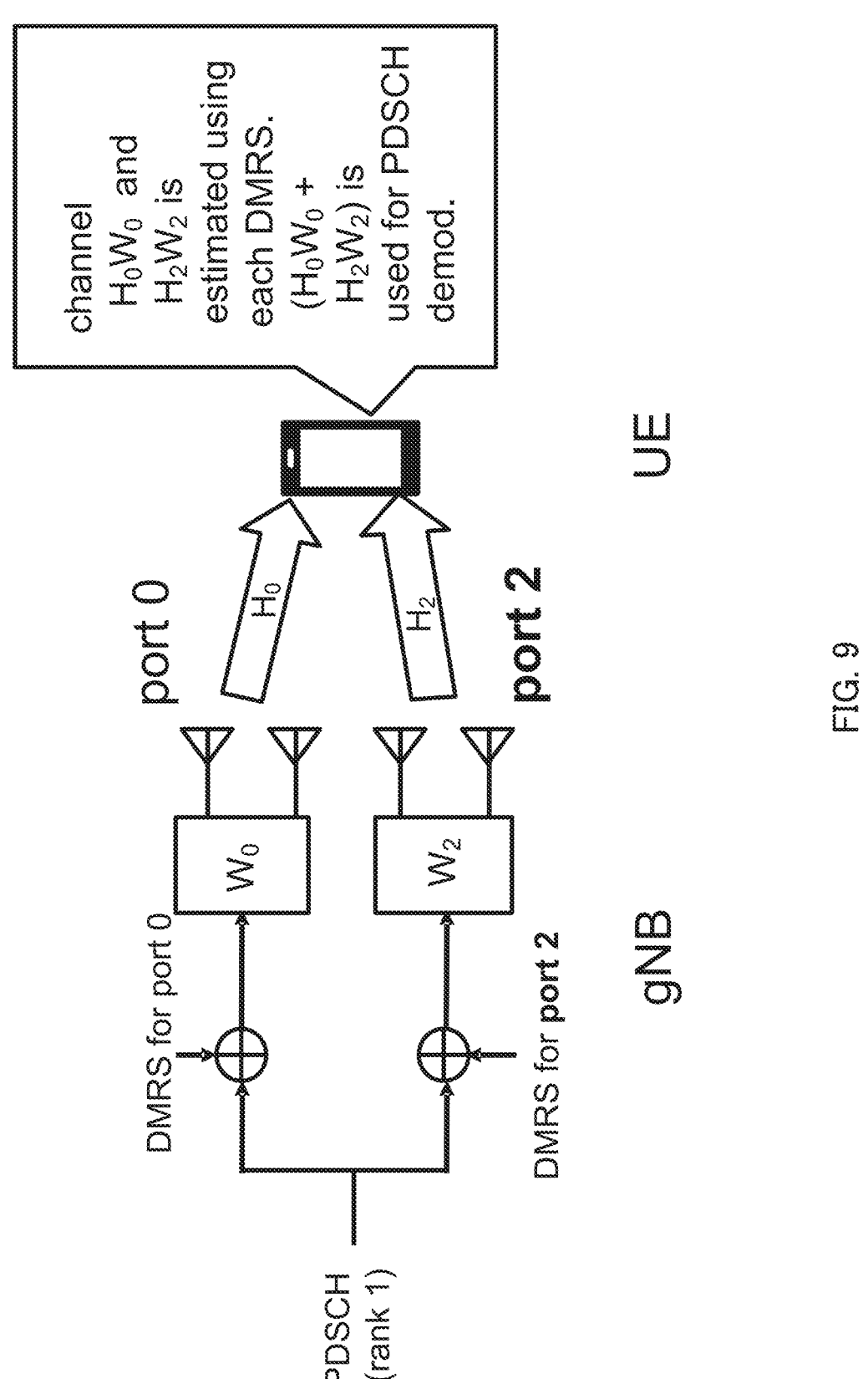
FIG. 9 is a diagram for describing Operation Example 1-3.

In one example, as illustrated in FIG. 9, base station 100 may generate two DMRSs respectively associated with two ports 0 and port 2 to be indicated terminal 200, and then transmit, via port 0, a data signal (e.g., PDSCH signal) and a DMRS associated with port 0. Base station 100 may also transmit, via port 2, a data signal (e.g., PDSCH signal) and a DMRS associated with port 2. Each of the data signals transmitted via ports 0 and 2 may be the same data signal.

Incidentally, in FIG. 9, $W_0$ and $W_2$ represent precoding matrices, and $H_0$ and $H_2$ represent propagation path matrices corresponding to the precoding matrices, $W_0$ and $W_2$, respectively. Terminal 200 may estimate a plurality of channels, based on the DMRSs of port 0 and port 2, and then obtain a plurality of channel estimation values, $H_0W_0$ and $H_2W_2$, for example. Terminal 200 may decode the PDSCH signal, based on the obtained plurality of channel estimation values, $H_0W_0$ and $H_2W_2$.

Hereinafter, with reference to FIG. 7, Operation Example 1-3 (S301 to S308) of base station 100 and terminal 200 will be described.

(S301) Base station 100 (e.g., controller 101) determines, for PDSCH, the number of ranks (e.g., one) and DMRS ports to be indicated to terminal 200 (e.g., DMRS ports 0 and 2), for example. In addition, base station 100 determines a PDSCH resource (e.g., time- and frequency-resources) to which the data signal is mapped, for example.

(S302) Base station 100 (e.g., DMRS generator 103) generates a DMRS associated with each of the indicated DMRS ports. Base station 100 (e.g., DCI generator 102) also generates DCI including information on the DMRS ports and the PDSCH resource that are to be indicated terminal 200.

(S303) Base station 100 (e.g., precoder 105) applies the plurality of precodings to the DMRSs and the data signal (e.g., PDSCH signal), for example. For the precoding, precoding matrices $W_0$ and $W_2$ may be applied, for example.

(S304) Base station 100 (e.g., signal mapper 106) maps, to a PDSCH resource on each of the DMRS ports, the data signal and DMRSs with different precodings (or may be the same) applied, for example. By way of example, base station 100 may map, to DMRS port 0, signals to which the precoding matrix, $W_0$, is applied, and maps, to DMRS port 2, signals to which the precoding matrix, $W_2$, is applied. Base station 100 also maps DCI to a PDCCH resource.

(S305) Base station 100 (e.g., transmitter 107) transmits, to terminal 200, the PDSCH resource and the signals mapped to the PDCCH resource, for example. Terminal 200 receives the PDSCH and the signals mapped to the PDCCH resource as described above.

(S306) Terminal 200 detects, by DCI detector 205, the DCI mapped to the PDSCH resource and identifies, by controller 208, information such as the DMRS port and the PDSCH resource indicated by the detected DCI. Further, terminal 200 (e.g., controller 208) determines that the number of ranks (e.g., one) is less than the number of DMRS ports that has been indicated (e.g., two), for example.

(S307) Terminal 200 (e.g., DMRS detector 204) detects DMRSs of the respective DMRS ports, based on the DMRS port identified in S306, for example. Further, terminal 200 (e.g., channel estimator 206) estimates channels corresponding to the respective DMRS ports by using the detected DMRSs, and thereby obtains channel estimation values, for example. For example, terminal 200 may obtain the channel estimation values, $H_0W_0$ and $H_2W_2$. Note that $H_0$ and $H_2$ may be propagation path matrices corresponding to DMRS port 0 and DMRS port 2, respectively.

(S308) Terminal 200 (e.g., demodulator/decoder 207) decodes the data signal on the PDSCH resource obtained in S305, by using the plurality of channel estimation values obtained in S307, for example. In one example, terminal 200 may decode the data signal by using the channel estimation value, $(H_0W_0+H_2W_2)$.

In Operation Example 1-3 mentioned above, the data signal and the DMRSs are transmitted by using each of the plurality of DMRS ports; hence, it is possible to improve the channel estimation accuracy in terminal 200. Therefore, the PDSCH received quality in terminal 200 can also be improved to achieve the coverage compensation. Further, in terminal 200, since the signals are received through the plurality of propagation paths corresponding to the plurality of precodings, the robustness of the PDSCH reception in terminal 200 can be improved by spatial diversity.

Operation Examples 1-1 to 1-3 have been each described, thus far.

According to the present embodiment, DMRS ports the number of which is greater than the number of ranks can be indicated to terminal 200 without modifying the existing indication method on the number of DMRS ports from base station 100 to terminal 200. Further, with Operation Examples 1-1 to 1-3, the PDSCH received quality of terminal 200 can be improved to achieve the coverage compensation.

Incidentally, Operation Examples 1-1 to 1-3 may be applied by being switched (i.e., selectively) in base station 100 as appropriate, for example.

Example 2

Next, as Operation Example 2, a description will be given of a method for base station 100 to determine which DMRS port is used (i.e., indicated to terminal 200) in Operation Examples 1-1 to 1-3 mentioned above.

Operation Example 2

As non-limiting Operation Example 2, the following two examples will be described:

Operation Example 2-1: DMRS ports are selected from different CDM groups; and

Operation Example 2-2: DMRS ports are selected from one CDM group.

Operation Example 2-1

Figure 10:
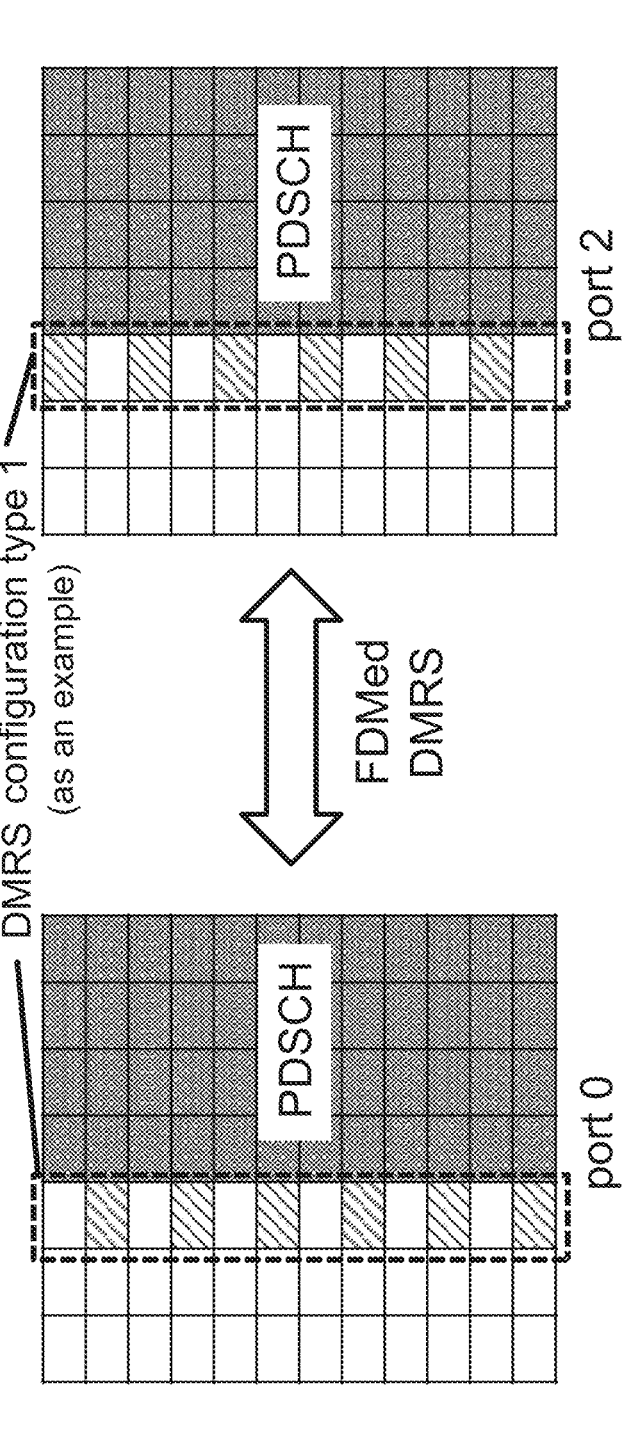
FIG. 10 illustrates all example of DMRS mapping according to Operation Example 2-1.

In Operation Examples 1-1 to 1-3 mentioned above, the DMRS ports to be indicated to terminal 200 may be selected from different CDM groups, for example. By way of example, DMRS port 0 belonging to CDM group 0, and DMRS port 2 belonging to CDM group 1 may be selected. In addition, DMRSs associated with the respective DMRS ports may be mapped to different frequency resources, that is, may be frequency-division multiplexed (FDMed). By way of a non-limiting example, FIG. 10 illustrates a DMRS mapping example in DMRS configuration type 1.

In the manner described above, performing the FDM inn the DMRSs associated with the respective DMRS ports indicated to terminal 200 allows base station 100 to increase the transmission power of DMRS, for example. This increases the received power of DMRS in terminal 200, and thereby improving the channel estimation accuracy. As a result, the PDSCH received quality in terminal 200 can be improved to achieve the coverage compensation.

Operation Example 2-2

Figure 11:
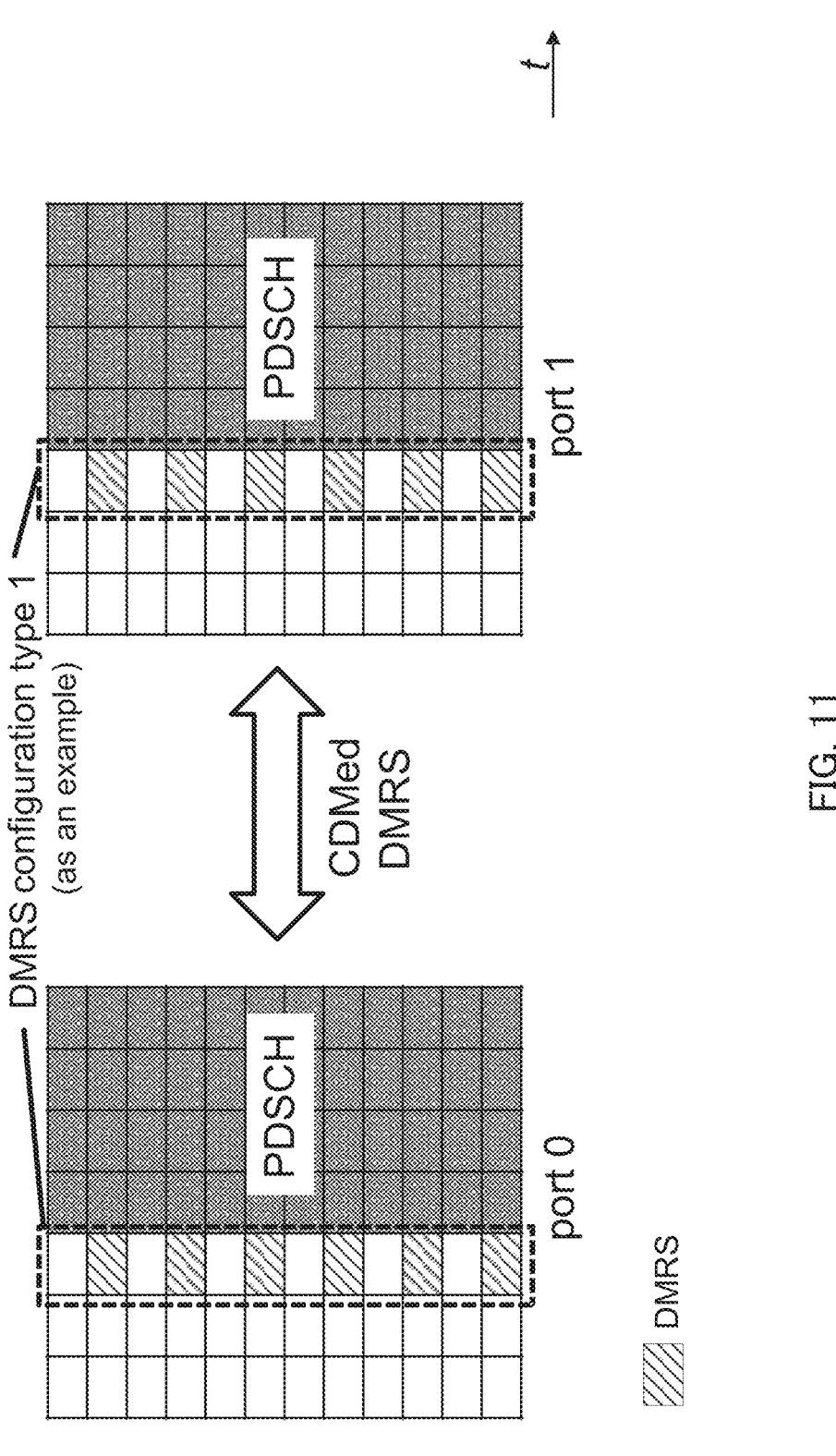
FIG. 11 illustrates an example of DMRS mapping according to Operation Example 2-2.

In Operation Examples 1-1 to 1-3 mentioned above, the DMRS ports to be indicated to terminal 200 may be selected from one CDM group (i.e., the same CDM group). For example, DMRS port 0 belonging to CDM group 0 and DMRS port 1 other than DMRS port 0 belonging to the same CDM group 0 may be selected. Further, different codes may be applied (e.g., multiplied) to DMRSs associated with the respective DMRS ports to be selected, that is, the DMRSs may be code-division multiplexed (CDMed). By way of a non-limiting example, FIG. 11 illustrates a mapping example in DMRS configuration type 1.

In the manner described above, performing the CDM on the DMRSs and applying a code that varies between the DMRS ports enable improvement of the robustness of the DMRS reception in terminal 200 by code diversity. This improves the channel estimation accuracy using DMRS in terminal 200. As a result, the PDSCH received quality in terminal 200 can be improved to achieve the coverage compensation. Incidentally, the resource configurations illustrated in FIG. 10 and FIG. 11 are each exemplary and are not limited to these examples. For example, the length of PDSCH is not limited to four symbols.

Example 3

As mentioned above, when a plurality of DMRS ports is indicated from base station 100 to terminal 200, independent of the number of ranks, terminal 200 cannot grasp, in some cases, the number of ranks actually used (or selected) in base station 100.

In a case where the number of ranks cannot be grasped, terminal 200 cannot grasp the size of a transport block (TB) (TB size or TBS) to be transmitted from base station 100, and thus, terminal 200 possibly cannot receive the TB appropriately.

Therefore, in Example 3, a description will be given of a mechanism in which terminal 200 can grasp the number of ranks to be actually used in base station 100 (i.e., method of configuration for or indication to terminal 200). This mechanism allows terminal 200 to grasp the number of ranks as appropriate, which makes it possible for terminal 200 to grasp the appropriate TBS and receive the TB properly. Hereinafter, an example of this mechanism will be described as Operation Example 3.

Operation Example 3

As Non-limiting examples, the following Operation Examples 3-1 to 3-3 are included:
Operation Example 3-1: Explicit signaling;
Operation Example 3-2: Implicit signaling; and
Operation Example 3-3: Configuration of the maximum number of ranks.

Operation Example 3-1

Base station 100 may explicitly indicate, to the mobile station, the number of ranks to be actually used, by using a higher-layer signalling or a control signal (e.g., DCI). The explicit indication allows terminal 200 to directly grasp the number of ranks.

Operation Example 3-2

Alternatively, base station 100 may implicitly indicate, to terminal 200, the number of ranks to be actually used. For example, the number of ranks may be identified by a value of the DCI that indicates the DMRS port. In one example, as in Operation Example 2-1, when DMRS ports to be indicated are selected from different CDM groups, terminal 200 may identify the number of ranks as one (or a number less than the number of indicated DMRS ports). Other wise, terminal 200 may identify that the number of indicated DMRS ports and the number of ranks are the same with each other.

According to Operation Example 3-2, terminal 200 can indirectly grasp the number of ranks, from the information on the DMRSs indicated from base station 100. In addition, the control signal overhead for terminal 200 can be reduced.

Operation Example 3-3

Base station 100 may indicate, to terminal 200, the maximum value of the number of ranks that may be used, by using a higher-layer signalling or a control signal (e.g., DCI). In one example, base station 100 tray set the maximum value of the number of ranks that may be used to one.

In this case, terminal 200 can identify that the number of ranks is one, independent of the identification of an antenna port. This reduces the control signal overhead for terminal 200.

Note that the methods with which terminal 200 grasps or identifies the number of ranks is not limited to Operation examples 3-1 to 3-3 mentioned above. Grasping or identifying the number of ranks in terminal 200 may be achieved by other methods.

Overall Complements (PDSCH)

Methods in the embodiment described above may be applied to, for example, a PDSCH scheduled by DCI in DCI format 1_0, DCI format 1_1, DCI format 1_2, or another format.

Additionally or alternatively, the methods in the embodiment described above may be applied to a PDSCH to be scheduled before or after application of a dedicated RRC configuration to terminal 200, for example. By way of example, with respect to a PDSCH scheduled by DCI format 1_0 and a PDSCH scheduled prior to the application of the dedicated RRC configuration, it is expected to improve the received quality, as compared to the existing method available only for one DMRS port.

(DMRS Configuration Type)

In the embodiment described above, a description has been given with a case, as a non-limiting example, where DMRS configuration type 1 and the number of front-load symbols for DMRS: 1 are configured, but the present disclosure may be applied to a case where DMRS configuration type 2, the number of front-load symbols: 2, or another configuration is configured. The DMRS mapping according to each configuration may conform to NPL 4. For example, in a case where DMRS configuration type 2 and the number of front-load symbols: 2 are configured, the type of antenna port available can be increased. Meanwhile, a DMRS mapping type may be Type A, Type B, or another Type. Further, an Additional Position of DMRS may be pos0, pos1, pos2, pos3 or another configuration, that is, a DMRS other than the front-load (Additional DMRS) may be or may not be mapped.

(Selection of DMRS to be Indicated)

Base station 100 may perform transmission, for a PDSCH (unicast) to be transmitted specific to terminal 200, for example, by multiplexing PDSCHs for a plurality of terminals 200 in the same time-resource and frequency-resource (e.g., Multi-user-Multiple Input Multiple Output, MU-MIMO). In this case, base station 100 may indicate a DMRS port that varies between the plurality of terminals 200.

In contrast, for a PDSCH (multicast, groupcast, or broadcast) to which a common signal (e.g., System Information Block (SIB)) is mapped for a plurality of terminals 200, for example, base station 100 may indicate a common DMRS port to the plurality of terminals 200.

Meanwhile, base station 100 may indicate a DMRS port with which the received quality increases in terminal 200, based on information such as channel status information (CSI), for example. Additionally or alternatively, terminal 200 may notify, indicate, suggest, or propose, to base station 100, a DMRS port that is desirably indicated to terminal 200 from a viewpoint of the received quality. This improves the received quality of a DMRS port in terminal 200. For the notification, indication, suggestion, or proposal to base station 100, an uplink channel, such as PRACH, PUSCH, or PUCCH, or an uplink signal, such as Uplink Control Information (UCI) or Sounding Reference Signal (SRS), may be used, for example.

(Indication of DMRS)

A correspondence relation between a value of a DCI parameter Antenna port(s) and a DMRS port to be indicated to terminal 200 may be extended as illustrated in FIG. 12, for example, so that more DMRS port combination can be indicated to terminal 200, as compared to the existing indication method. Such extension allows base station 100 to enhance the flexibility of the DMRS port indication to terminal 200.

Additionally or alternatively, for indication a DMRS port in the above-mentioned embodiment, information such as a value configured for terminal 200 (e.g., UE ID, Radio Network Temporary identifier (RNTI), e.g., Cell RNTI(C-RNTI), Configured Scheduling RNTI(CS-RNTI) and the like). a cell ID, a Physical Cell Identifier (PCI), and indices of a time-resource and a frequency-resource may be used instead of the control signal, for example. This reduces the control signal overhead for terminal 200.

As an example of the DMRS port indication in Operation Examples 1-1 and 1-2, the indication to the terminal may be made by a value of DCI parameter Antenna port(s), and, of DMRS ports corresponding to the value, some of the DMRS ports may be used. By way of example, in FIG. 12, DMRS ports 0 and 1 correspond to value 2, and thus, it may be determined to use only the first half of the indicated DMRS ports, i.e., 0, in Operation Examples 1-1 and 1-2 described above. Alternatively, it may be determined to use only the latter half of the indicated DMRS ports, i.e., 1.

Further, in the above, whether to make a determination to use only the first half or only the latter half of the indicated DMRS ports may be judged based on information such as a value configured for terminal 200 (e.g., UE ID, RNTI, and the like mentioned above) and indices of a time-resource and a frequency-resource, for example. Incidentally, a description has been given with the first half and the latter half portion, but the present disclosure is not limited to these, and a first portion and a second portion may be used.

(Selection of DMRS Port for Mapping of Data Signal)

Base station 100 may select a DMRS port to which the data signal is mapped (e.g., the first DMRS port in Operation Example 1-1 mentioned above), based on information such as the channel status information, and then indicate the selected port to terminal 200, for example. Additionally or alternatively, terminal 200 may notify, indicate, suggest, or propose, to base station 100, a DMRS port to which data signal is desirably mapped, for example. This improves the received quality of the data signal in terminal 200. For the notification, indication, suggestion, or proposal to base station 100, an uplink channel, such as PRACH, PUSCH, or PUCCH, or an uplink signal, such as UCI or SRS, may be used, for example.

Additionally or alternatively, the DMRS port to which the data signal is mapped may be determined based on, instead of the control signal, information such as a value configured for terminal 200 (e.g., UE ID, RNTI, and the like mentioned above) and indices of a time-resource and a frequency-resource, for example. This reduces the control signal overhead for terminal 200.

(Selection of Precoding)

Base station 100 may determine a precoding matrix to be applied to a DMRS port, based on information such as the channel status information, for example. Additionally or alternatively, terminal 200 may notify, indicate, suggest, or propose, to base station 100, a precoding matrix that is desired to be applied to the DMRS port from a viewpoint of the received quality. This improves the received quality of a DMRS port in terminal 200. For the notification, indication, suggestion, or proposal to base station 100, an uplink channel, such as PRACH, PUSCH, or PUCCH, or an uplink signal, such as UCI or SRS, may be used, for example.

Additionally or alternatively, base station 100 may determine a precoding matrix to be applied to a DMRS port, based on the information such as a value configured for terminal 200 (e.g., UE ID, RNTI, and the like mentioned above) and indices of a time-resource and a frequency-resource, for example.

(Terms)

The term "DMRS port" may be mutually replaced with another term, such as "antenna port," "PDSCH port," and "port."

The term "number of transmission ranks" may be mutually replaced with another term, such as "transmission rank," "number of ranks," "rank," "number of transmission layers," "number of MIMO layers," or "number of layers."

The term, such as "part" or "portion" or the term ending with a suffix, such as "-er" "-or" or "-ar" may be replaced with another term, such as "circuit (circuitry)," "device," "unit," or "module."

(Exemplification)

The DMRS port numbers, such as DMRS ports 0, 1, and 2, the CDM groups numbers, such as CDM groups 0 and 1, the precoding matrices, and the propagation path matrices that have been described in the embodiment mentioned above are each non-limiting examples.

Further, in the embodiment mentioned above, a case has been given as an example where two DMRS ports are indicated to terminal 200, but this is an example, and three or more DMRS ports may be indicated to terminal 200. Further, in Operation Example 1-1, a case has been given as an example where there is one first DMRS port and one second DMRS port, but this is an example, and the present disclosure is not limited to this example.

In addition, in the above-mentioned embodiment, a case where the number of ranks is one has been given as an example, but this is merely an example, and the number of ranks may be two or more.

(Mobile Station Type and Identification)

In the embodiment mentioned above, terminal 200 may be, for example, a "RedCap mobile station." The "RedCap mobile station" may be, for example, a mobile station having at least one of the features (i.e., characteristics, attributes or capabilities) described below.

1. Mobile station that reports, to base station 100, that it is "a mobile station subject to the coverage compensation (enhancement)," "a mobile station that receives a signal repeatedly transmitted," and "a RedCap mobile station." For the report, an uplink channel, such as PRACH, PUSCH, or PUCCH, or an uplink signal, such as UCI or SRS may be used, for example.

2. Mobile station that falls under at least one of the following performances (capabilities) or a mobile station that reports at least one of the following performances to base station 100. For the report, an uplink channel, such as PRACH, PUSCH, or PUCCH, or an uplink signal, such as UCI, SRS may be used, for example:

Mobile station with reception antennae implemented the number of which is equal to or less than a threshold (e.g., threshold value=1);

Mobile station that can support downlink reception antenna ports the number of which is equal to or less than a threshold value (e.g., threshold value=2);

Mobile station that can support transmission ranks the number of which is equal to or less than a threshold value (e.g., threshold value=2);

Mobile station that can receive a Synchronization Signal Block (SSB) in a frequency band of or above a threshold value (e.g., Frequency Range 2 (FR2) or band of 52 GHz or more);

Mobile station with a process time longer than or equal to a threshold value;

Mobile station with a transport block the available size of which (TBS: transport block size) is equal to or less than a threshold value;

Mobile station with MIMO layers available the number of which is equal to or less than a threshold value;

Mobile station with modulation orders available the number of which is equal to or less than a threshold value;

Mobile station with Hybrid Automatic Repeat request (HARQ) available the number of which is equal to or less than a threshold value; and Mobile station supporting Rel-17 or later.

3. A mobile station to which base station 100 indicates a parameter corresponding to a RedCap mobile station, for example, a Subscriber Profile ID for RAT/Frequency Priority (SPID).

(Quasi Co-Location, QCL)

Terminal 200 may assume, determine, or consider that the DMRS ports in the above-mentioned embodiment are in the relation of Quasi Co-Location (QCL). In this case, terminal 200 can perform the channel estimation, assuming that some characteristics are shared between the DMRS ports, based on information on the propagation path characteristics of the received DMRSs (e.g., information such as Doppler shift, Doppler diffusion, average delay, delay diffusion, or spatial reception parameter), and thus, the computational complexity can be reduced.

(Control Signal)

In an exemplary embodiment of the present disclosure, the downlink control signal (or downlink control information) may be, for example, a signal (or information) to be transmitted via a Physical Downlink Control Channel (PDCCH) in the physical layer, or a signal (or information) to be transmitted via Medium Access Control (MAC) or Radio Resource Control (RRC) of the higher layer. Incidentally, the signal (or information) is not limited to a case of being indicated by the downlink control signal and may be previously specified by the specifications (or standards) or may be previously configured for a base station and a terminal. Further, a data signal may include a higher-layer signalling.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may substitute for a base station. Further, instead of a base station, a relay apparatus may be adopted for relaying the communication between a higher node and a terminal.

(Uplink/Downlink)

The above embodiment has been described with the downlink including Physical Downlink Control Channel (PDCCH) and Physical Downlink Shared Channel (PDSCH), but the above embodiment may be applied in uplink. In one example, the above embodiment may be applied to a Physical Uplink Shared Channel (PUSCH), a Physical Uplink Control Channel (PUCCH), or a Physical Random Access Channel (PRACH).

(Application to Sidelink)

An exemplary embodiment of the present disclosure may be applied to the communication using the sidelink for vehicle to everything (V2X) or communication between terminals. In this case, PDCCH may be replaced with a physical sidelink control channel (PSCCH), PUSCH/PDSCH may be replaced with a physical sidelink shared channel (PSSCH). Further, a control signal in sidelink may include at least one of the 1st stage sidelink control information (SCI) and the 2nd stage SCI.

PDCCH, PDSCH, PUSCH, and PUCCH are examples of a downlink control channel, a downlink data channel, an uplink data channel, and an uplink control channel, respectively. Further, PSCCH and PSSCH are examples of a side link control channel and a side link data channel, respectively.

(Data Channel/Control Channel)

The above embodiment has been described with the DMRS in PDSCH as an example, but the above embodiment is not limited to this and may be applied to another reference signal, a synchronization signal, PDCCH used for transmission of control information, or PBCH used for transmission of broadcast information.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of, in addition to a Demodulation Reference Signal (DMRS), a Channel State Information-Reference Signal (CSI-RS), a Tracking Reference Signal (TRS), a Phase Tracking Reference Signal (PTRS), a Cell-specific Reference Signal (CRS), or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiment described above and may be other numbers of symbols.

(Frequency Band)

An exemplary embodiment of the present disclosure may be applied to either of a licensed band or an unlicensed hand. In this case, a channel access procedure (Listen Before Talk (LBT), carrier sense, and/or Channel Clear Assessment (CCA)) may be performed prior to transmission of each signal.

(Communication)

An exemplary embodiment of the present disclosure may be applied to any of the communication between a base station and a terminal, the communication between terminals (Sidelink communication, Uu link communication), and the communication for Vehicle to Everything (V2X). In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either of terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network. (Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 13:
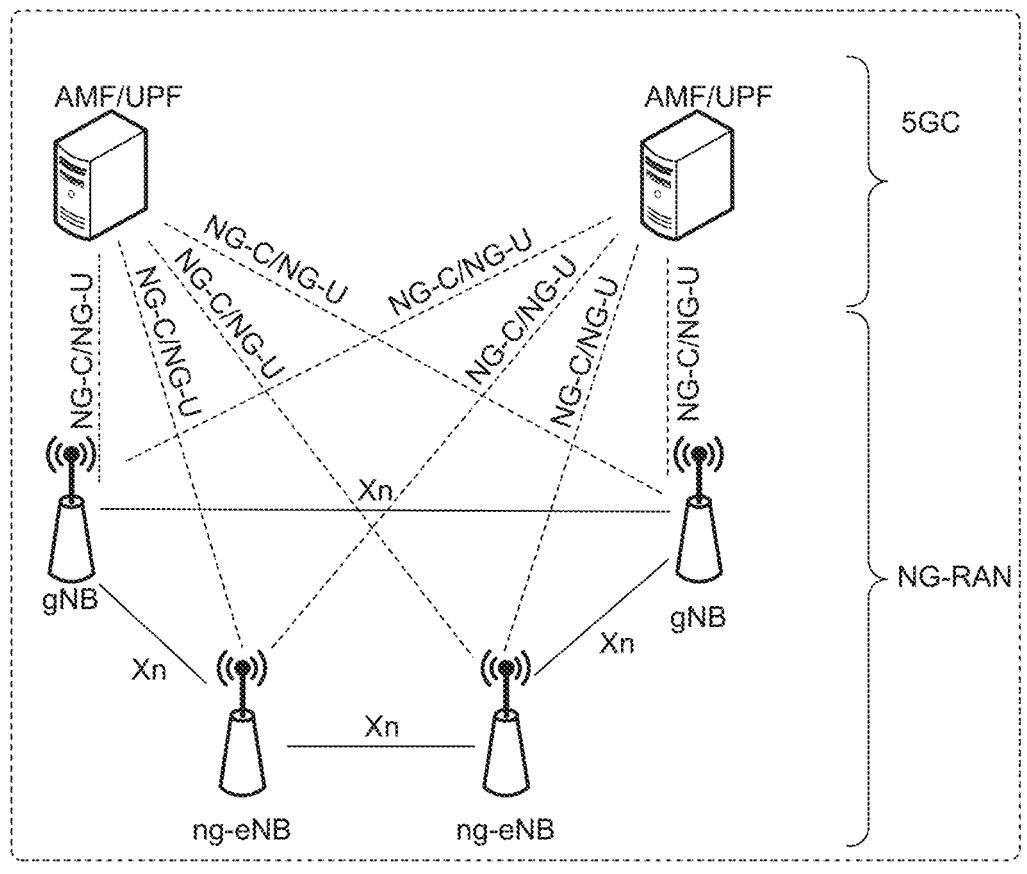
FIG. 13 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 13 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300), RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing Δf are directly related through the formula Δf=1/Tu. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 14:
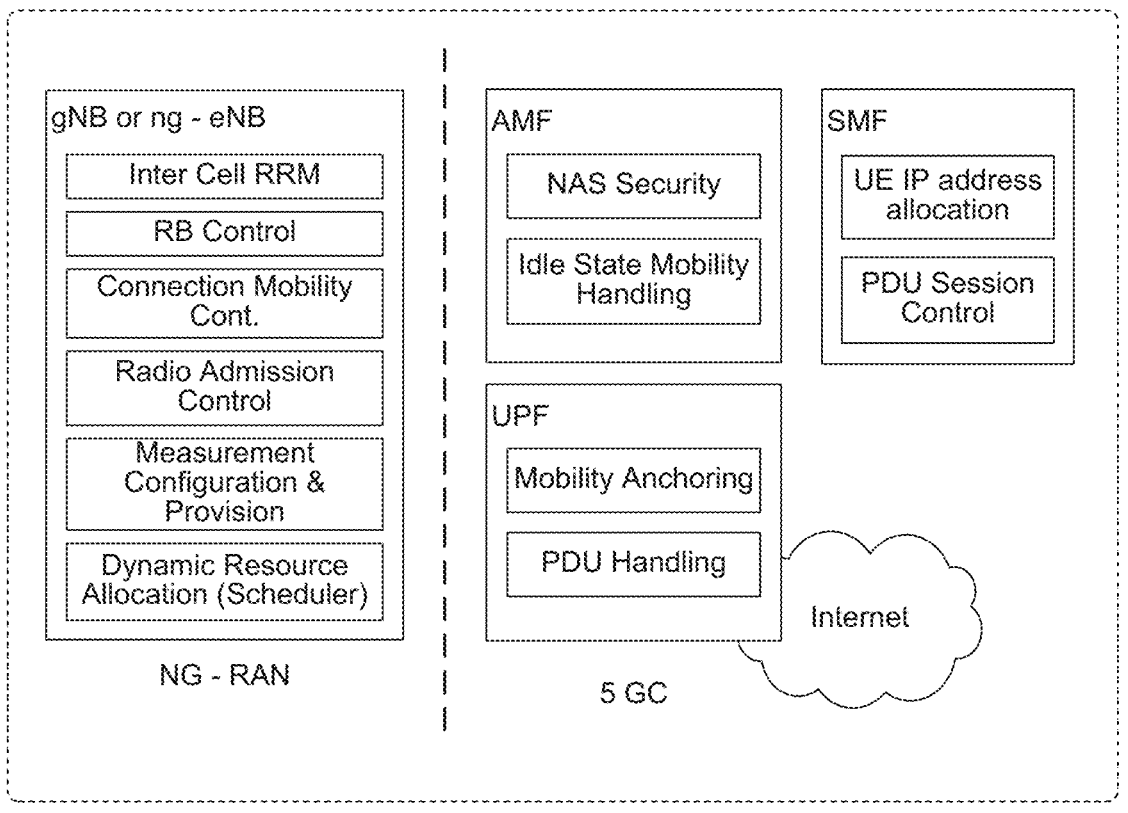
FIG. 14 is a schematic diagram illustrating a functional split between Next Generation-Radio Access Network (NG-RAN) and 5th Generation Core (5GC)

FIG. 14 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function if downlink packet buffering and downlink data notification triggering.

Finally, the Session Management Function (SMF) hosts the following main functions:

Session management;

UE IP address allocation and management;

Selection and control of UPF;

Configuration function for traffic steering at the User Plane Function (UPF) to route traffic to a proper destination;

Control part of policy enforcement and QoS; and

Downlink data notification.

<RRC Connection Setup and Reconfiguration Procedure>

Figure 15:
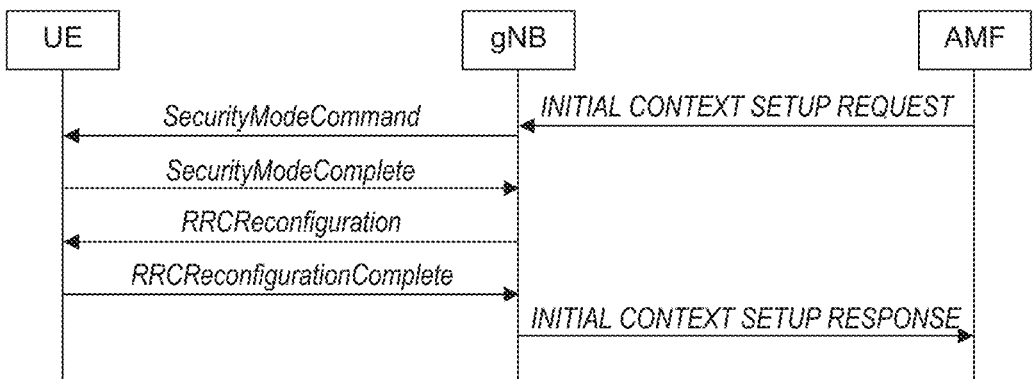
FIG. 15 is a sequence diagrams of a Radio Resource Control (RRC) connection setup/reconfiguration procedure.

FIG. 15 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signalling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearers) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio hearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 16:
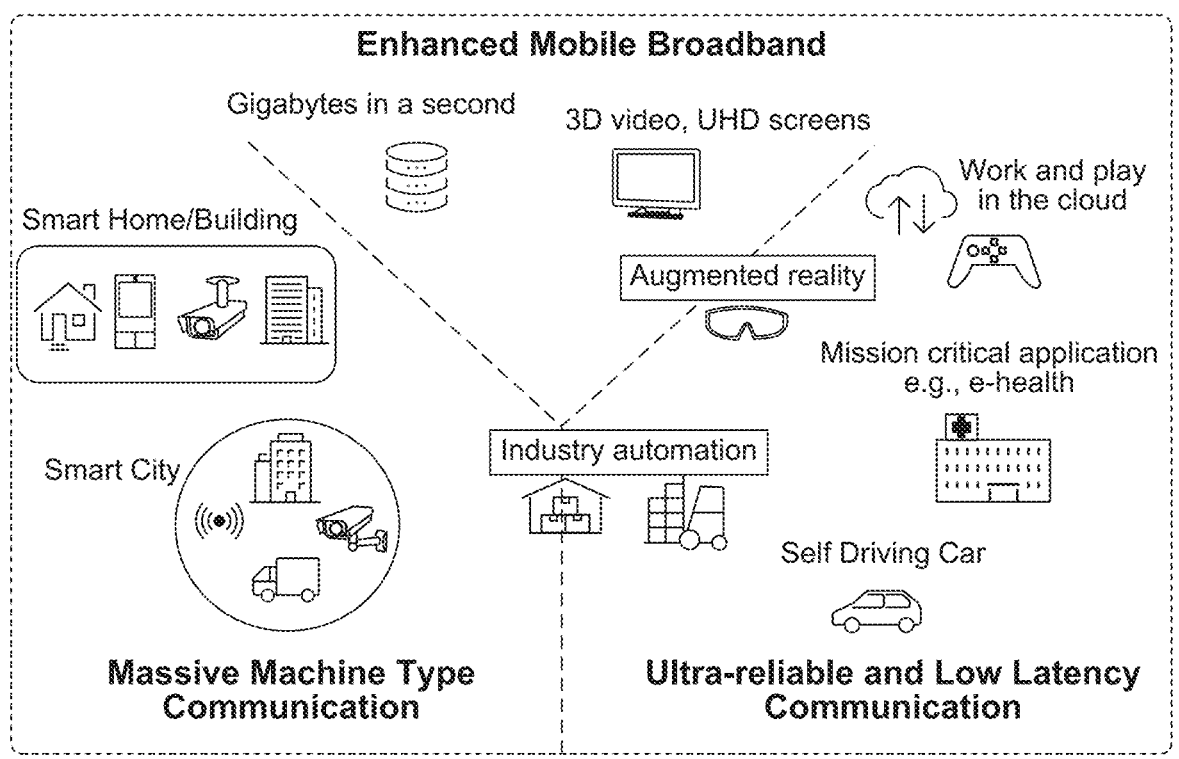
FIG. 16 is a schematic diagram illustrating usage scenarios of enhanced Mobile BroadBand (eMBB), massive Machine Type Communications (mMTC), and Ultra Reliable and Low Latency Communications (URLLC)

FIG. 16 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 16 illustrates some examples of envisioned usage scenarios for IMT for 2020 and beyond (see ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1E-5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1E-5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session, e.g., as illustrated above with reference to FIG. 15. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 17:
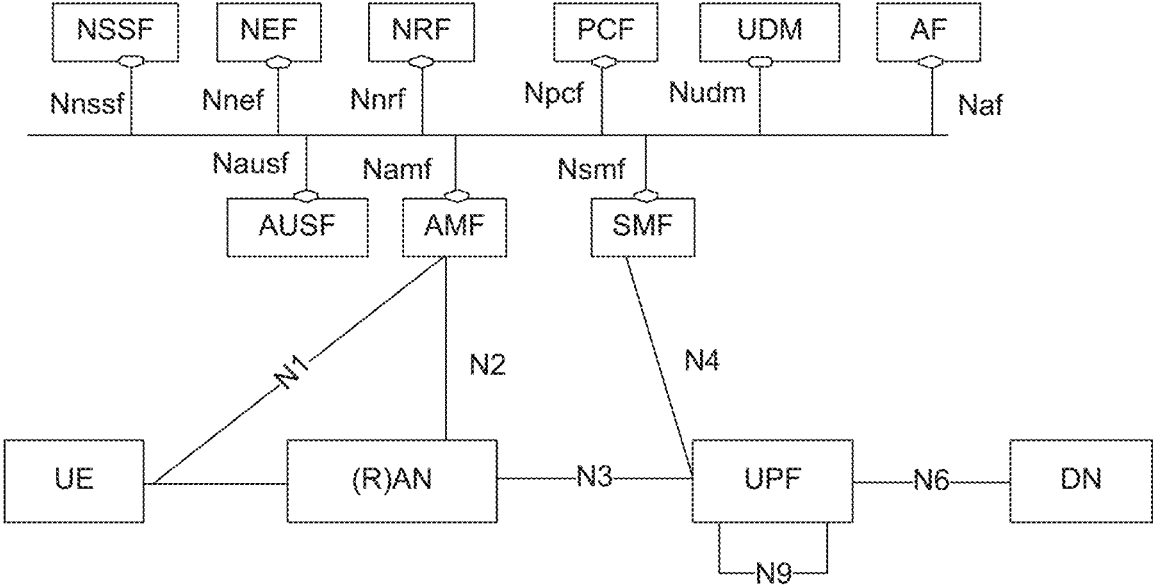
FIG. 17 is a block diagram illustrating an exemplary 5G system architecture for a non-roaming scenario.

FIG. 17 illustrates a 5G NR non-roaming reference architecture (see TS 23.501 v16.1.0, section 4.23). An Application Function (AF) (e.g., an external application server hosting 5G services, exemplarily described in FIG. 16) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 17 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of the embodiment described above can be partly or entirely realized by an LSI such as an integrated circuit, and each process described in the embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: reception circuitry, which, in operation, receives information indicating a plurality of ports for a reference: signal for a downlink data signal; and control circuitry, which, in operation, controls reception of the downlink data signal and the reference signal, based on the number of ranks which is less than the number of the plurality of ports indicated by the information.

In an exemplary embodiment of the present disclosure, the control circuitry may determine that, of the plurality of ports indicated by the information, the downlink data signal and a first demodulation reference signal are transmitted via a first port and a second demodulation reference signal that is associated with a second port transmitted via the first port.

In an exemplary embodiment of the present disclosure, the control circuitry may determine that, of the plurality of ports indicated by the information, the downlink data signal and a demodulation reference signal are transmitted via a first port and a plurality of precodings is applied to the first port.

In an exemplary embodiment of the present disclosure, the control circuitry may determine that a demodulation reference signal and the same downlink data signal are transmitted via each of the plurality of ports indicated by the information.

In an exemplary embodiment of the present disclosure, the control circuitry may determine that a preceding that varies between at least two of the plurality of ports is applied.

In an exemplary embodiment of the present disclosure, the plurality of ports indicated by the information may belong to different code-division multiplexing groups.

In an exemplary embodiment of the present disclosure, the plurality of ports indicated by the information may belong to the same code-division multiplexing group.

In an exemplary embodiment of the present disclosure, the number of ranks may be explicitly indicated from a base station.

In an exemplary embodiment of the present disclosure, the number of ranks may be implicitly identified by the information indicating the plurality of ports.

In an exemplary embodiment of the present disclosure, a maximum number of supportable ranks may be configured for the number of ranks.

In an exemplary embodiment of the present disclosure, the terminal may be a reduced capability terminal A base station according to an exemplary embodiment of the present disclosure includes: transmission circuitry, which, in operation, transmits information indicating a plurality of ports for a reference signal for a downlink data signal; and control circuitry, which, in operation, controls transmission of the downlink data signal and the reference signal, with the number of ranks which is less than the number of the plurality ports indicated by the information.

A communication method according to an exemplary embodiment of the present disclosure includes: receiving, by a terminal, information indicating plurality of ports for a reference signal for a downlink data signal; and controlling, by the terminal, reception of the downlink data signal and the reference signal, based on the number of ranks which is less than the number of the plurality of ports indicated by the information.

A communication method according to an exemplary embodiment of the present disclosure includes: transmitting, by a base station, information indicating a plurality of ports for a reference signal for a downlink data signal; and controlling, by the base station, transmission of the downlink data signal and the reference signal, with the number of ranks which is less than the number of the plurality of ports indicated by the information.

The disclosure of Japanese Patent Application No. 2020-174051, filed on Oct. 15, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101 Controller
102 DCI generator
103 DMRS generator
104 Encoder/modulator
105 Precoder
106 Signal mapper
107 Transmitter
108 Antenna
109 Receiver
110 Demodulator/decoder
200 Terminal
201 Antenna
202 Receiver
203 Signal separator
204 DMRS detector
205 DCI detector
206 Channel estimator
207 Demodulator/decoder
208 Controller
209 Encoder/modulator
210 Transmitter

The invention claimed is:

1. A terminal, comprising:
reception circuitry, which, in operation, receives information indicating a plurality of ports for a reference signal for a downlink data signal; and
control circuitry, which, in operation, controls reception of the downlink data signal and the reference signal, based on a number of ranks which is less than the number of the plurality of ports indicated by the information, wherein
the control circuitry determines one of:
    (i) that the downlink data signal with the number of ranks=1, and demodulation reference signals associated with the plurality of ports, are transmitted from one port of the plurality of ports; or
    (ii) that the same downlink data signal with the number of ranks=1 and a demodulation reference signal are transmitted from each of the plurality of ports.

2. The terminal according to claim 1, wherein the control circuitry determines that, of the plurality of ports indicated by the information, the downlink data signal and a first demodulation reference signal are transmitted via a first port and a second demodulation reference signal that is associated with a second port is transmitted via the first port.

3. The terminal according to claim 1, wherein the control circuitry determines that, of the plurality of ports indicated by the information, the downlink data signal and a demodulation reference signal are transmitted via a first port and a plurality of precodings is applied to the first port.

4. The terminal according to claim 1, wherein the control circuitry determines that a demodulation reference signal and the same downlink data signal are transmitted via each of the plurality of ports indicated by the information.

5. The terminal according to claim 4, wherein the control circuitry determines that a precoding that varies between at least two of the plurality of ports is applied.

6. The terminal according to claim 1, wherein the plurality of ports indicated by the information belongs to different code-division multiplexing groups.

7. The terminal according to claim 1, wherein the plurality of ports indicated by the information belongs to the same code-division multiplexing group.

8. The terminal according to claim 1, wherein the number of ranks is explicitly indicated from a base station.

9. The terminal according to claim 1, wherein the number of ranks is implicitly identified by the information indicating the plurality of ports.

10. The terminal according to claim 1, wherein, for the number of ranks, a maximum number of supportable ranks is configured.

11. The terminal according to claim 1, wherein the terminal is a reduced capability terminal.

12. A base station, comprising:
transmission circuitry, which, in operation, transmits information indicating a plurality of ports for a reference signal for a downlink data signal; and
control circuitry, which, in operation, controls transmission of the downlink data signal and the reference signal, with the number of ranks which is less than the number of the plurality of ports indicated by the information, wherein
the control circuitry determines one of:
    (i) that the downlink data signal with the number of ranks=1, and demodulation reference signals associated with the plurality of ports, are transmitted from one port of the plurality of ports; or
    (ii) that the same downlink data signal with the number of ranks=1 and a demodulation reference signal are transmitted from each of the plurality of ports.

13. A communication method, comprising:
receiving, by a terminal, information indicating a plurality of ports for a reference signal for a downlink data signal;
controlling, by the terminal, reception of the downlink data signal and the reference signal, based on the number of ranks which is less than the number of the plurality of ports indicated by the information; and
determining, by the terminal, one of:
    (i) that the downlink data signal with the number of ranks=1, and demodulation reference signals associated with the plurality of ports, are transmitted from one port of the plurality of ports; or
    (ii) that the same downlink data signal with the number of ranks=1 and a demodulation reference signal are transmitted from each of the plurality of ports.

14. A communication method, comprising:
transmitting, by a base station, information indicating a plurality of ports for a reference signal for a downlink data signal;

controlling, by the base station, transmission of the downlink data signal and the reference signal, with the number of ranks which is less than the number of the plurality of ports indicated by the information; and determining, by the base station, one of:

(i) that the downlink data signal with the number of ranks=1, and demodulation reference signals associated with the plurality of ports, are transmitted from one port of the plurality of ports; or (ii) that the same downlink data signal with the number of ranks=1 and a demodulation reference signal are transmitted from each of the plurality of ports.

* * * * *